(12) United States Patent
Rocklitz

(10) Patent No.: US 10,699,344 B2
(45) Date of Patent: Jun. 30, 2020

(54) SYSTEM AND METHOD FOR CALCULATING FUTURE VALUE

(71) Applicant: Sage Decision Systems, LLC, Burnsville, MN (US)

(72) Inventor: Gary John Rocklitz, Burnsville, MN (US)

(73) Assignee: Sage Decision Systems, LLC, Burnsville, MN (US)

( * ) Notice: Subject to any disclaimer, the term of this patent is extended or adjusted under 35 U.S.C. 154(b) by 0 days.

(21) Appl. No.: 16/671,604

(22) Filed: Nov. 1, 2019

(65) Prior Publication Data

US 2020/0065906 A1 Feb. 27, 2020

Related U.S. Application Data

(62) Division of application No. 13/610,238, filed on Sep. 11, 2012, now Pat. No. 10,515,412.

(51) Int. Cl.
*G06Q 40/06* (2012.01)

(52) U.S. Cl.
CPC ................... *G06Q 40/06* (2013.01)

(58) Field of Classification Search
CPC ...................................... G06Q 40/06
USPC ...................................... 705/36 R
See application file for complete search history.

(56) References Cited

U.S. PATENT DOCUMENTS

| 2003/0084058 | A1 | 5/2003 | Christodoulou et al. |
| 2006/0200400 | A1 | 9/2006 | Hunter et al. |
| 2008/0010032 | A1* | 1/2008 | Sugiyama ........ G05B 19/41875 702/75 |
| 2010/0114526 | A1 | 5/2010 | Hosking |
| 2011/0119204 | A1* | 5/2011 | De Prisco .............. G06Q 40/00 705/36 R |
| 2014/0074751 | A1 | 3/2014 | Rocklitz |

OTHER PUBLICATIONS

Prosecution History from U.S. Appl. No. 13/610,238, dated Sep. 12, 2013 through Aug. 16, 2019, 557 pp.

* cited by examiner

*Primary Examiner* — Robert R Niquette
*Assistant Examiner* — Liz P Nguyen
(74) *Attorney, Agent, or Firm* — Shumaker & Sieffert, P.A.

(57) ABSTRACT

A system and method for determining a composite bounded probability distribution of values of a first parameter at one or more values of a second parameter. A bounded probability distribution of values of a common first parameter is defined for each of one or more values of a common second parameter. A composite bounded probability distribution is determined for the portfolio at a selected value of the second parameter by performing a frequency domain convolution using the bounded probability distribution of each object at the selected value of the second parameter.

28 Claims, 14 Drawing Sheets

SYSTEM AND METHOD FOR CALCULATING FUTURE VALUE

This application is a divisional of U.S. application Ser. No. 13/610,238, filed Sep. 11, 2012, which is incorporated herein by reference in its entirety

BACKGROUND

Predictions of future value are critical in industries ranging from business planning to stock market prediction to health outcomes to military outcomes to political outcomes to horse racing.

For instance, Monte Carlo methods are used in insurance, investment, and other industries to predict likely outcome or future value. Monte Carlo methods (or Monte Carlo experiments) are a class of computational algorithms that rely on repeated random sampling to estimate likely outcome. Monte Carlo methods are especially useful for simulating complex non-linear systems with coupled interactions. These methods have been used to model phenomena with significant uncertainty in inputs, such as the calculation of risk in business. Related patents in this area include U.S. Pat. Nos. 8,095,392, 8,036,975, and their precedents.

In theory, Monte Carlo systems can handle arbitrarily large and complex systems provided sufficient rules and interactions are defined. In practice, often hundreds of thousands of trials need to be run to get rough approximations of likely outcomes. For example, 10 independent input variables trialed 10 times each yields 10 million system trial outputs ($10^{10}$), yet if effects related to a single input are significantly non-linear, it is possible that maxima and minima will be missed by this rough sampling. Therefore, Monte Carlo-based predictions are costly in terms of the time and resources needed to perform the calculations. Further, many computer-based Monte Carlo methods require explicit statements (computer programmed rules) defining the complex relationships between inputs and outputs.

Neural Nets have been used to replace programmed rules by using learning sets to train the nets. In this approach, data replaces knowledge and understanding of interactions—the programmed rules. But, with sufficient and good training data, Neural Nets have been shown to predict not just optima, but also likeliness of outcome. Again, typically histogram approximations to probability distribution curves, surfaces, etc, are produced.

Genetic Algorithms, Particle Swarm methods, and other optimization techniques have been used to reduce the number of trials needed to find local and sometimes global optima, but typically at the expense of understanding interactions. Optimization methods work well when many inputs are involved to find the "best" but typically, these methods will not expose interactions or the solution space: A small cloud of points around "best outcome" is typically produced, along with tracks to that point, but a distribution describing the probability of the outcome or likelihood of second best—is not produced.

One major fault with most numerical methods—no matter how complex, is that they rely on a good understanding of the problem (the rules), or sufficient data to describe the solution space. Most numerical methods rely on explicit knowledge: who, what, where, when, how much, quantified statements of likelihood, facts. Yet most business decisions, and most other decisions people make, that is to say, attempts to predict future value or likelihood of outcomes (the subject of this patent), are made using both explicit knowledge and tacit knowledge. Explicit knowledge: who, what, where, when, how much, quantified statements of likelihood, facts. Tacit knowledge: why, beliefs, opinions, feelings, hunches, and other non-quantifiable statements of likelihood.

Methods have been developed that work to incorporate tacit domain expert knowledge, along with other processing tools like decision fault trees, decision maps, models, and other visualization tools like the process of U.S. Pat. No. 8,103,601. Fundamentally, these methods are trying to get at the fact that much of the knowledge used by business executives, and everyone else, to make decisions is tacit rather than explicit, and are incorporating expensive processes to turn that tacit knowledge into rules amenable to processing by logic trees and other numerical methods.

Business planners use methods such as Gantt charts, the Critical Path Method (CPM) and Program Evaluation Review Technique (PERT) to attempt to understand critical paths and time to completion. In one approach, the project planner assigns a minimum, maximum and expected duration to each task, earliest start and finish times and last start and finish times. A simulator calculates an ending date as a function of the minimum, maximum and expected durations, the earliest start and finish times and the last start and finish times. In one such approach, the minimum, maximum and expected duration assumptions for each task are modeled in the simulator using a triangular, beta or gamma distribution of possible duration values. Such an approach is described by Johnathan Mun in *Advanced Analytical Models*, John Wiley & Sons, Jun. 2, 2008. Such approaches are useful for scheduling but are less useful for predicting changes in value over time.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

A decision is the selection between possible actions. Decisions are seldom binary, but rather a matter of looking for a best compromise to reach desired goals. The goal is typically to maximize one or more near term values (profit, health, safety, security, inventory turns, sales, troop deployments, voter results whatever is valued), maximize long term value and growth, and to minimize risk. As noted above, risk, near term value and long term value can be difficult to assess. The task becomes even more difficult when one attempts to determine near term value, long term value and risk across a collection of possibly inter-related actions and outcomes.

Figure 1:
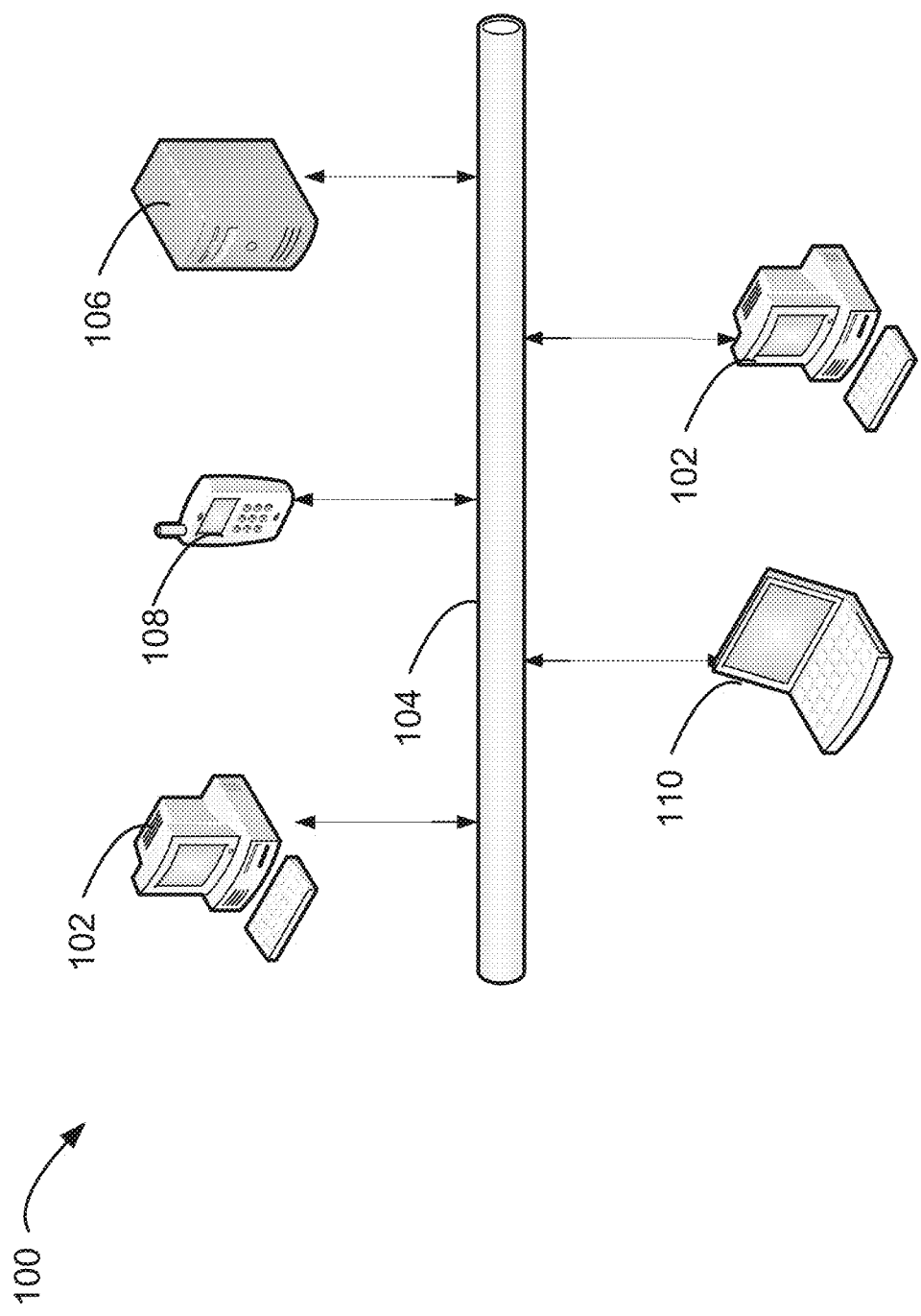
FIG. 1 illustrates a system for assessing future value according to the present invention.

A system 100 for assessing one or more near term values, long term values and risk across a collection of possibly inter-related actions and outcomes is shown in FIG. 1. In the example embodiment shown in FIG. 1, system 100 includes one or more computers 102 connected across a network 104 to a server 106. In one example embodiment, an application running on a computing device such as smart phone 108 or laptop 110 provides portable access to system 100 for determining near term value, long term value and risk across a collection of possibly inter-related actions and outcomes.

In the following discussion, a portfolio is a collection of possibly inter-related objects having a common value parameter that may vary over a parameter such as time. For example, an investment portfolio may include a company's stock, a precious metal and a bond. The common parameter here is the monetary value of each investment in the portfolio; that common parameter may vary for each investment over the parameter time.

Common parameters other than monetary value can be tracked as well. In one such example, the portfolio is a company's product portfolio. Here, the objects in the portfolio are a company's products. Again, the common value parameter may be monetary value, but it could be factory capacity, supply chain risk, or any other parameter common to the objects in the portfolio. The parameter over which the object varies may be, for instance, time, or it could be another parameter such as number of employees, inflation rate, or currency exchange rates.

Figure 2:
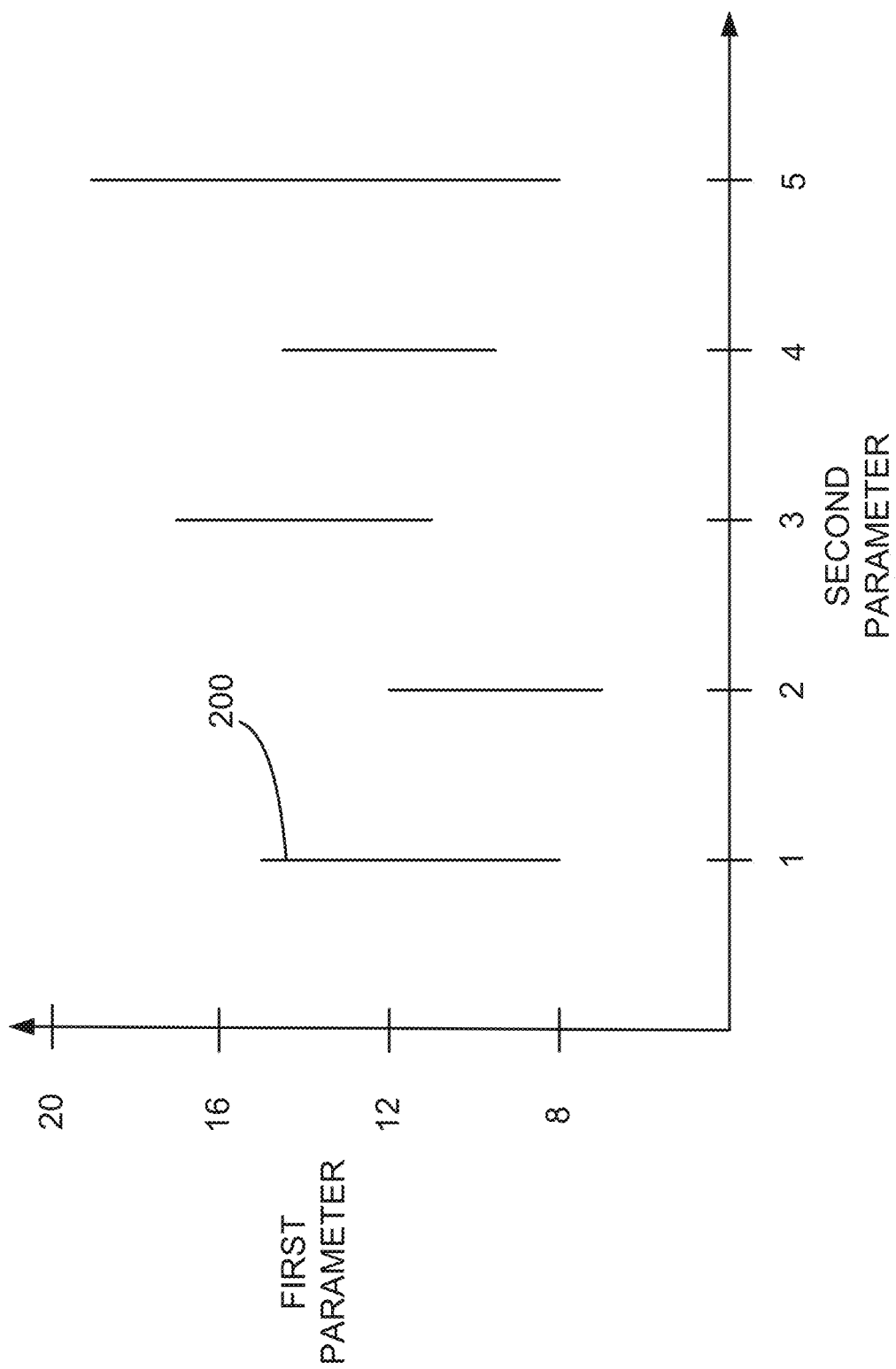
FIG. 2 illustrates an object having a series of probability distributions reflecting future values of the first parameter for each of a plurality of values of the second parameter.

In one embodiment, the value parameter has a probability distribution reflecting expected values for the value parameter at each particular value of a second parameter (such as time). An example embodiment of such an approach is shown in FIG. 2. In the example shown in FIG. 2, the first parameter has an equal likelihood of being a value between 8 and 15 when the second parameter is equal to 1. For example, if the first parameter is value in dollars and the second parameter is time in months, the first parameter has an equal likelihood of being any value between $8 and $15 when the second parameter is equal to 1 month. Similarly, as shown in FIG. 2, the first parameter has an equal likelihood of being any value between $7 and $12 when the second parameter is equal to 2 months. One can depict through the use of a probability distribution 200 at any point in time, likely values for the first parameter at a particular value of the second parameter.

Figure 3:
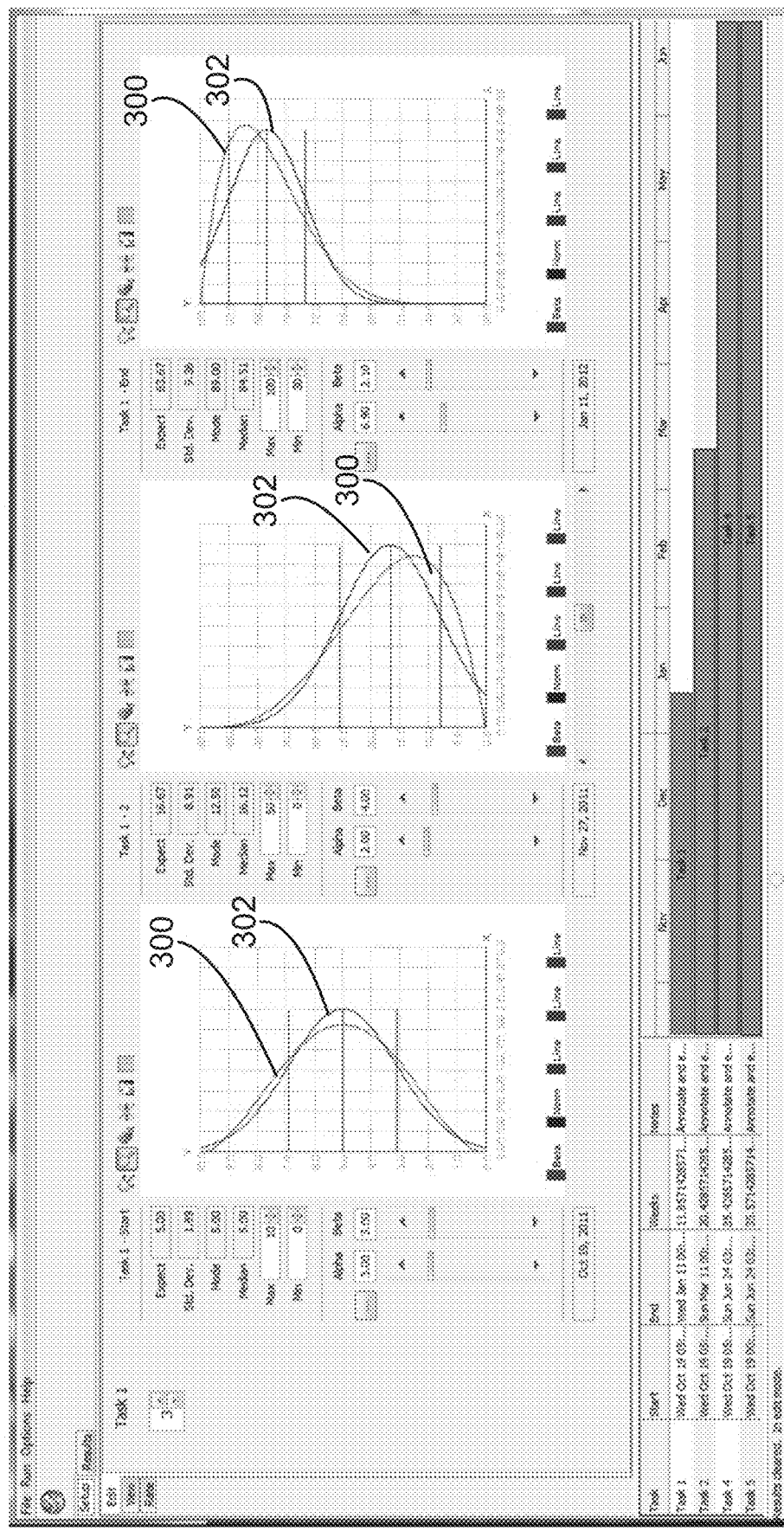
FIG. 3 provides a graphical illustration of probabilities as a function of time for a single task.

In one embodiment, a probability function is assigned to the first parameter at particular values of the second parameter. Examples of probability functions assigned to particular values of the second parameter are shown in FIG. 3. As you can see in FIG. 3, the second parameter is time. Three different dates are given with a probability function detailing likely values of the first parameter at each of the three different dates. Two probability distributions are shown at each date in FIG. 3, a beta distribution 300 and a normal distribution 302.

In the example shown in FIG. 3, the collection of inter-related objects in the portfolio is a collection of possibly inter-related actions, and outcomes. An action-outcome is defined here as a task. A task has one or more different measures of value, and those values may or may not change over time. A task may have associated decisions or choices in time (hire a salesman, pay salary and commissions over time), or may not have associated decisions: a task modeling economic headwind, or the effects of ash from a volcano on airline fare prices and/or respiratory health. Tasks in a portfolio may share one or more of the same values and inter-related resources, for example investment choices and profit outcomes, or may have different values and inter-related outcomes (security vs. ease of access, health vs. risk). So, tasks in a portfolio may be inter-related either in the sense that they affect each other, or they affect one or more of the values in time being predicted or measured within the portfolio. It is possible tasks that do not share common values and do not inter-relate could be put in a common portfolio. Until a linking task is entered into the portfolio, the resultant tasks effectively decouple, and do not affect their respective values.

Task value may be biased by factors. Factors are effects that may or may not vary in time that affect task value, but are not themselves modeled as tasks. Factors may be measurable or not measurable—explicit or tacit. For example task: run a marathon, value: health, factor: runner's age, factor: humidity at some time during the day of the race, factor: emotional state of the runner. Factors may be common between tasks, and may or may not cause tasks to inter-relate.

Figure 4:
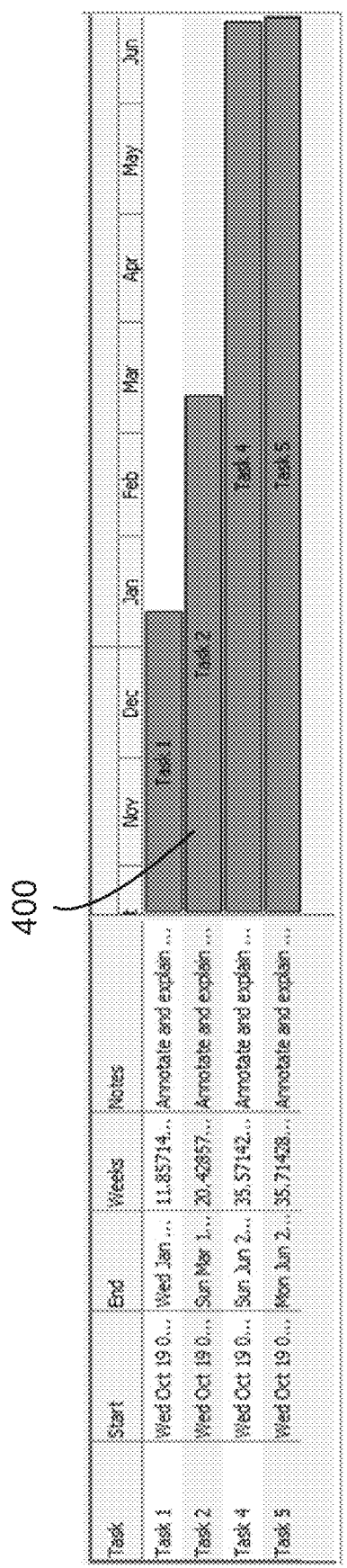
FIG. 4 illustrates shows a Gantt-like chart view of the tasks within a portfolio.

In an embodiment of this invention, a portfolio may be presented in a Gantt-like chart (FIG. 4). While a Gantt chart is a commonly used method to show tasks over time with start and stop points, it is to be understood that tasks 400 as defined here are to have the broader meaning of actions that have outcomes and one or more values that change over some parameter. Here the parameter is time, but parameters such as temperature, population density, etc. could be used as well.

So, a task has one or more measures of value that vary in a parameter such as time. As can be seen in FIG. 3, however, is that instead of a single value projected at each time, now we have a measure of each possible value of the first parameter at a particular value of the second parameter modeled by a value probability model. A value probability model may be, for example, continuous, piecewise continuous, discrete value, histogram, or some other model of probability distribution, but it represents various probabilities of some measure of some value at that point in, for instance, time.

In one time-based embodiment, probability models are defined at or near task beginning and task end. Probability models may also be defined at as many other points in time along the task as desired. Probability models may be defined at different points in time for measures of different values on the same task. As an example of one way to represent this relationship, FIG. 3 shows three probability models of value defined for Task1.

In one embodiment, objects in the portfolio are grouped as tasks and displayed as in FIG. 4. In one such embodiment, one clicks on a task to open a window displaying probability distributions defined at various times for that task. For instance, by clicking on Task 1 in FIG. 4, one would open a window such as is displayed in FIG. 3. One could then observe or modify the probability distributions at one or more values of the second parameter to reflect ones understanding of the value of the first parameter at that value of the second parameter. Here, one could adjust values of the first parameter at the start or end of the task, or at a point somewhere in between.

This is a significant difference between this method and other systems and methods used for calculating future value. Rather than calculating likelihood based on rules and assumptions, in this approach, users explicitly state, by defining value probability models at points in time for a task, exactly what the likelihood is of that task obtaining that value at that point in time. One significant advantage of this method is that tacit knowledge as well as explicit knowledge is easily captured in the user's generation of probability models at points in time along a task. Tacit knowledge: why, beliefs, opinions, feelings, hunches, and other non-quantifiable statements of likelihood are often as important to the decisions people make, that is to say, attempts to predict future value or likelihood of outcomes, as explicit knowledge: who, what, where, when, how much, quantified statements of likelihood, facts. Example: what you would like for dinner is as likely to influence where you go for dinner as what restaurants are nearby. By users generating value probability models at points of time along a task, tacit knowledge (e.g., opinions) are inherently captured without the need for questioning of domain experts to determine rules needed by more cumbersome methods of determining future value.

In one example embodiment, such as is shown in FIG. 3, value probability models are generated by a single user changing coefficients defining a continuous probability distribution. In another example embodiment, groups of individuals cooperate to vary the coefficients of the probability model by consensus. In another embodiment, probability models are assembled from discreet guesses as to likelihood. These discreet guesses could come from more traditional Monte Carlo or other methods of predicting future value, or they could come from poll results, or they could come from crowd sourcing, or any other source of discreet statements of value.

Any function, in the mathematical sense of a single resultant dependent value for given independent values, may be used to represent value probability models. In one embodiment, we use a function that integrates over its range to a value of 1. In one such embodiment, we use scaled and normalized beta distributions as shown in FIG. 3.

Gaussian distributions and log-normal distributions are often used to model probability of occurrence or likelihood. But Gaussian distributions are defined over the interval minus infinity to plus infinity, and log-normal distributions from 0 to plus infinity. In reality, few things conceptually, and nothing on this earth scales to infinity. Thus, while easy and commonly used, these distributions are less useful models of likelihood. These models are useful, because the location of mean and shape may be easily defined, but to be correct, these models ought to be clipped to some range other than plus or minus infinity. Clipping can be done, but then the resultant distribution should be normalized to an integral of 1 to represent all likelihoods, and the functions may have more parameters and become harder to use.

The Common Beta Distribution is a continuous function. It is a probability distribution in the sense that it's integral (the area under the curve) is 1. A common Beta Distribution by itself is not very useful, because it is defined on the range 0 to 1. It has advantages over a Gaussian distribution in that it can take many useful shapes—from a constant value to a ramp to something that looks very much like a Gaussian distribution, to many other shapes. To be useful in this approach to displaying probability distributions, the common beta distribution is transformed and scaled. Transformed: Its lower value is offset from 0 to some lower value (say A), and its range is scaled from 1 to some upper value (say B). The transformation may be linear, or non-linear in the same way a Gaussian distribution may be transformed to yield a log-normal distribution. Scaled: The dependent values of the distribution are scaled such that the integral of the new transformed distribution has a value of 1. A Gaussian distribution may be exactly defined by two parameters: mean and standard deviation. Similarly, our transformed and scaled beta distribution may be exactly defined by four parameters: lower bound (A), upper bound (B), alpha, and beta. As with other probability distributions, on this transformed and scaled beta distribution, mean, mode, median, variance, and other statistical measures may be calculated. In the example shown in FIG. 3, the probability distribution at Oct. 19, 2011 has a minimum value approaching zero, a maximum value approaching zero, an alpha of 3.0 and a beta of 3.0. The probability distribution at Nov. 30, 2011 has a minimum value of zero, a maximum value of 50.0, an alpha of 2.0 and a beta of 4.0. Finally, the probability distribution at Jan. 11, 2012 has a minimum value of 30.0, a maximum value of 100.0, an alpha of 6.9 and a beta of 2.1. It should be noted that the transformed and scaled beta probability distribution graphed at Oct. 19, 2011, while representative of a distribution with an alpha and beta of 3.0, is a graphical convenience. With a minimum value of zero, and a maximum value of zero, the distribution in fact collapses to a point. For graphing purposes, we gave this single point a very small (meaninglessly small) range.

Figure 5:
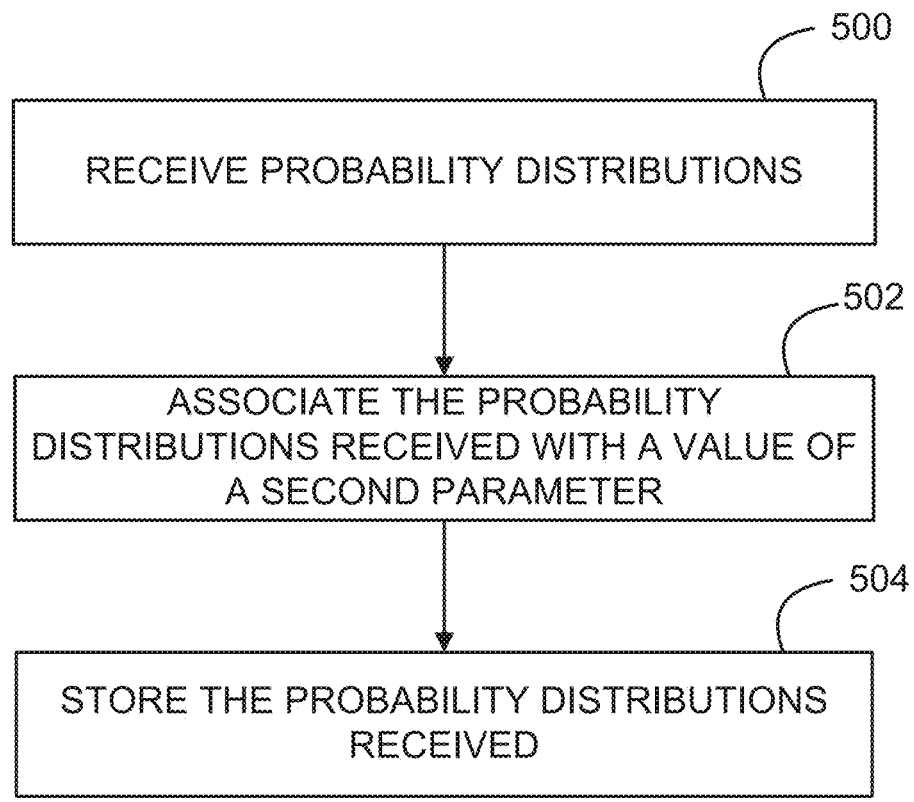
FIG. 5 shows a method of entering probability distributions according to the present invention.

A method of determining a probability distribution of values of objects in a portfolio of objects for one or more values of a second parameter is shown in FIG. 5. In the example embodiment shown in FIG. 5, the objects in the portfolio share a common first parameter that may vary over a second parameter such as time. The first and second parameters are different parameters.

At 500, a probability distribution for values of the first parameter at a particular value of the second parameter is received from, for example, a domain expert.

At 502, the received probability distribution is associated with the domain expert from whom it was received and with that value of the second parameter and, at 504, the probability distribution is stored as a function of the value of the second parameter they are associated with and as a function of the domain expert from whom they were received.

The probability distributions, once stored, can be displayed by domain expert in a display such as is shown in FIG. 3.

Figure 6:
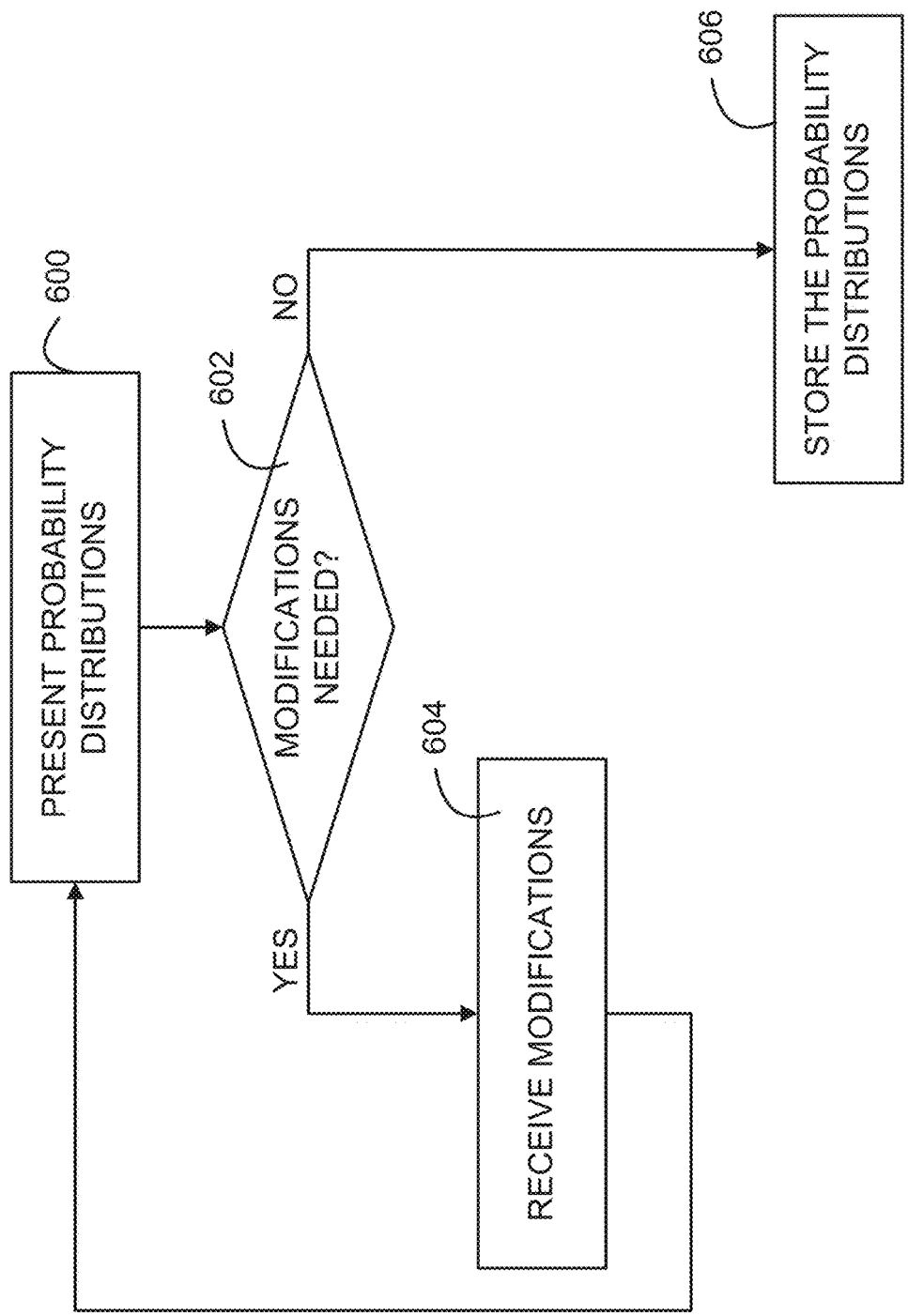
FIG. 6 shows a method of modifying probability distributions according to the present invention.

In one embodiment, system 100 displays probability distributions at predetermined points along one of the axes. A method of determining possible values of the first parameters for one or more objects at one or more values of the second parameter is shown in FIG. 6. In the example embodiment, a portfolio has a plurality of objects. The objects share one or more common first parameters that vary over a second parameter and system 100 is capable of determining possible values of the first parameters for one or more objects at one or more values of the second parameter. As can be seen in FIG. 6, a probability distribution associated with one of the objects is presented to each participant at 600. Participants can be selected, e.g., from users, from domain experts and from people representing of cross-section or segment of society. The probability distribution reflects possible values of one of the first parameters at a value of the second parameter. Each participant determines at 602 whether the probability distribution reflects the participant's expectation for values for that first parameter for that object at that value of the second parameter. If not, the participant, at 604, modifies the probability distribution and control moves to 600. The process is repeated as necessary until the probability distribution reflects the participant's expectation for values for that first parameter for that object at that value of the second parameter. Control then moves from 602 to 606 and the probability distributions are stored.

In one such embodiment, modifying at 604 includes varying, under participant control, parameters associated with one or more of the probability distributions. In one embodiment, each probability distribution is presented graphically and the participant modifies the shape of the graphical representation as needed.

Figure 7:
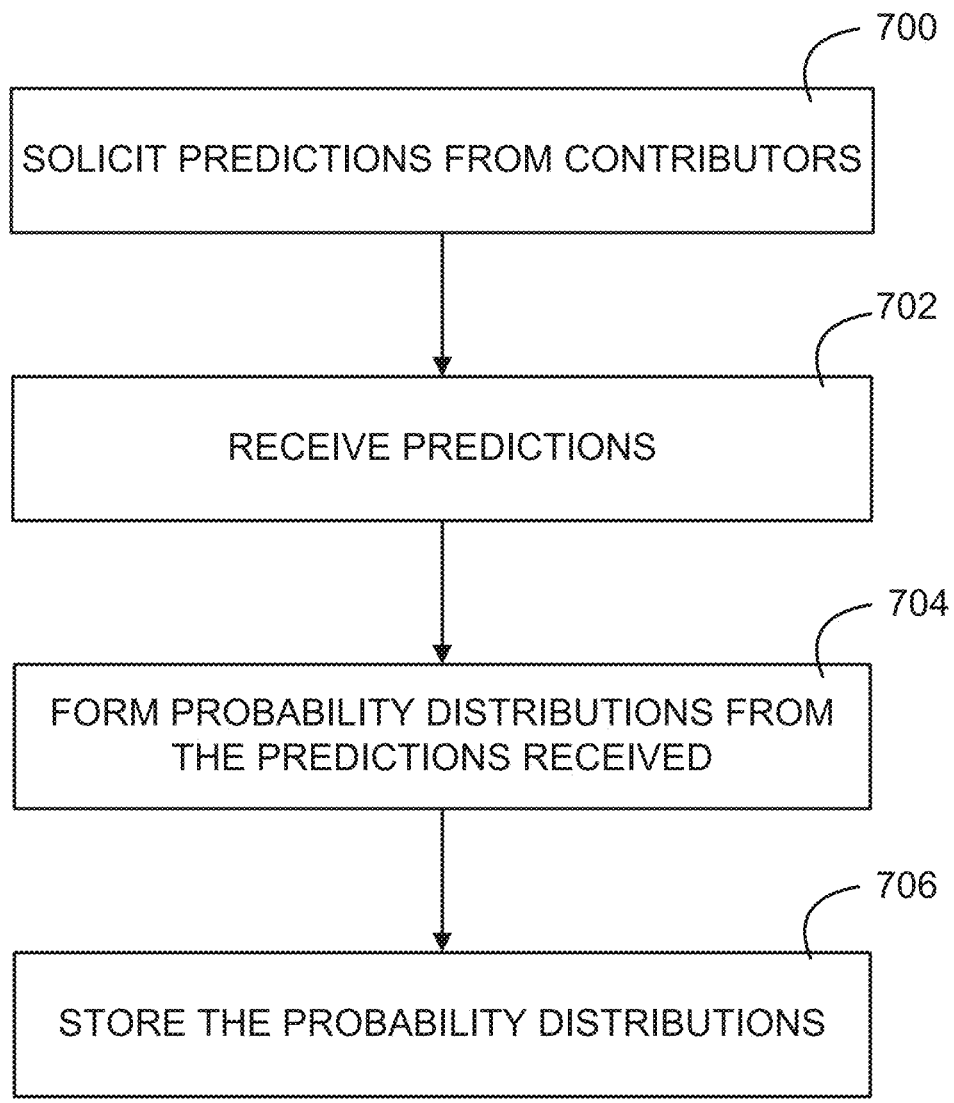
FIG. 7 illustrates a method of soliciting values used to form probability distributions according to the present invention.

In one embodiment, system 100 solicits predictions of values for first parameters for various values of a second parameter (such as time). System 100 then generates probability distributions for the various values of the second parameter based on the predictions received. A method for determining probability distributions of values of the first parameters for various values of the second parameter is shown in FIG. 7. In the example embodiment of FIG. 7, a portfolio has a plurality of objects. The objects share one or more common first parameters that vary over a second parameter and system 100 is capable of determining possible values of the first parameters for one or more objects at one or more values of the second parameter. As can be seen in FIG. 7, at 700, system 100 solicits predictions, from a group of contributors and for one or more particular values of the second parameter, of values of the first parameter for one or more objects in the portfolio. At 702, system 100 receives predictions of values of the first parameter at particular values of the second parameter for one or more objects in the portfolio and, at 704, forms, based on the predictions, a probability distribution for values of the first parameter at particular values of the second parameter. The resulting probability distributions are stored at 706.

In one example embodiment, each prediction received is a discrete value and the probability distribution for each value of the second parameter is determined as a function of the discrete values received. In one such embodiment, predictions form a histogram, based in the frequency of particular predictions, of potential values of the first parameter in the probability distribution. In one such embodiment, a continuous distribution of values in the probability distribution for each value of the second parameter is calculated as a function the prediction samples.

Interpolation

Figure 8:
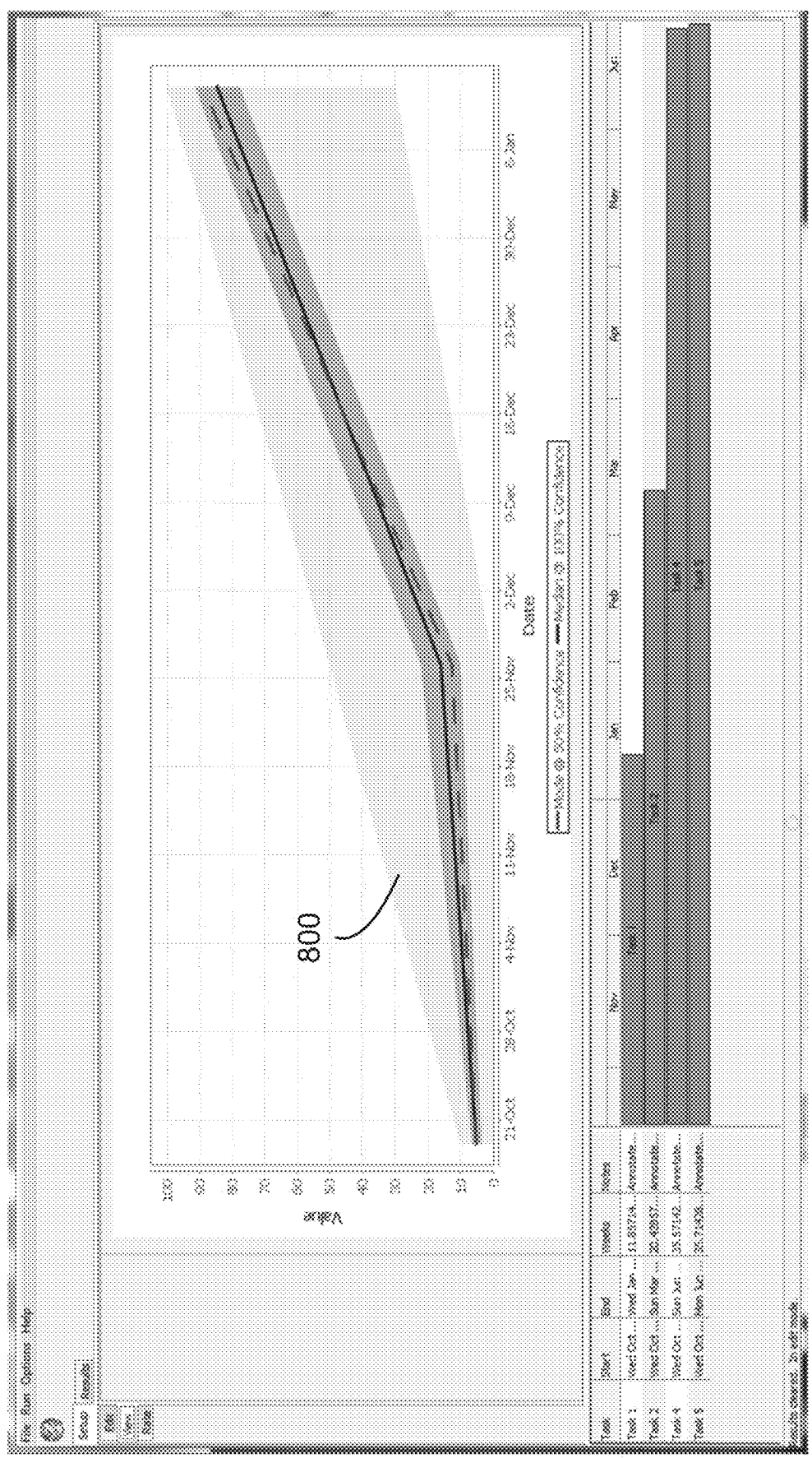
FIGS. 8 and 9 provide representations of probability distributions of values of a first parameter across time according to the present invention.
Figure 9:
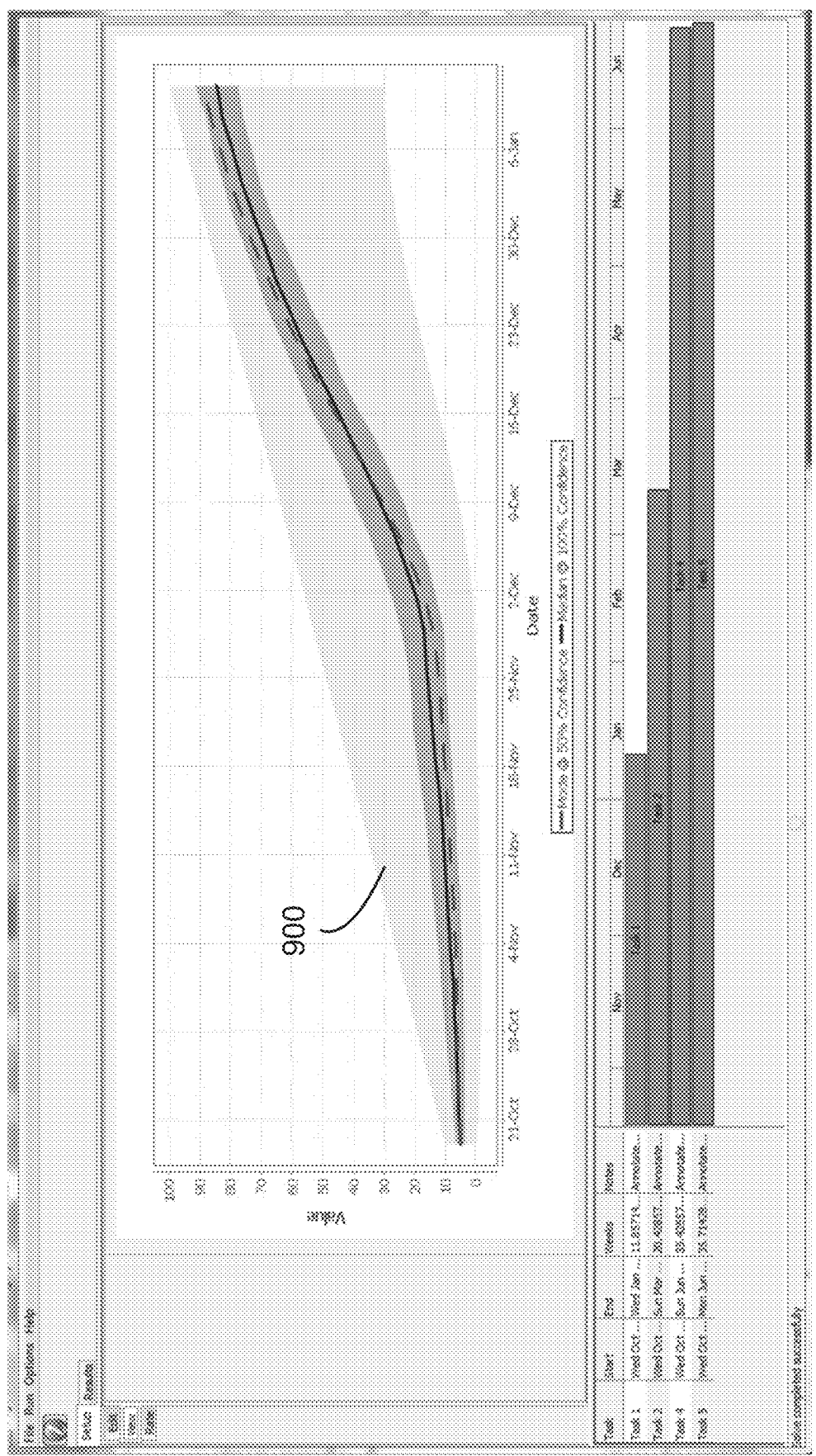

With probability models defined by user inputs at points in time along a task, in one example embodiment of system 100 interpolation functions are used to define intermediate probability models at points in time where probability models were not entered. Say probability models were entered at beginning, end, and some point in the middle of a task, and it is desired to know the likelihood of the task having a value at some intermediate point in time, interpolation functions may be used. Interpolation functions may take many forms: linear interpolation, exponential, spline, piecewise, or other—depending on the need and considered appropriateness of the interpolation function. Interpolation may be performed on the coefficients used to define the probability models, or on common percent likelihood values from one probability model to another. Whichever methods are used, the intent is that interpolation functions calculate intermediate probability models between entered probability models at points in time along a task. As non-limiting examples, FIG. 8 shows the results 800 of piecewise linear interpolation functions being used to predict intermediate likelihood over time for a value of Task 1 in FIG. 4 given the three entries for transformed and scaled beta probability models on Task 1 shown in FIG. 3. Task 1 of FIG. 4 has transformed and scaled beta probability models defined at start time, one intermediate time, and end time as noted above. Piecewise linear interpolation between the entered time values of FIG. 3 yields the interpolated values for Minimum Value, Lower limit of 50% confidence band, Median (solid line), Mode (dashed line), Upper limit of 50% confidence band, and Maximum Value as graphed in FIG. 8. Note the abrupt change in slope of the Mode, Median, and other curves at the Nov. 30, 2011 date. This is an artifact of using piecewise linear interpolation functions. As another non-limiting example, FIG. 9 shows more realistic interpolated values 900 for the same Task 1 entered models by using non-linear interpolation functions. Again, the median and mode lines are solid and dashed lines, respectively.

Intermediate probability models may be calculated at many points along a task, as may be seen by the smoothness of the curves in FIG. 9. Further, by using the methods outlined above, rates of change of value, and likelihood of rates of change of value may also be calculated simply by calculating the change of slope of the predicted lines of FIG. 8 or 9. The calculation of burn rates (rates of change of value) is useful in one or more embodiments of this invention as will be detailed below.

It should also be seen that if satisfactory interpolation functions are defined, they may also be used to extrapolate beyond a task's modeled end date either by extension of the function or its derivatives. In one example embodiment, system 100 uses interpolation functions to extrapolate to a future value beyond known values of time. If the interpolation function is known, its derivative may be calculated. Otherwise, difference equations may be used to approximate derivatives.

In one or more embodiments, for a portfolio containing more than one task, intermediate probability models are calculated at the same point in time for each task whose start and end points span that time. Entered probability models for tasks do not have to be coincident in time. Interpolated probability models can be calculated that are coincident in time. These interpolated probability models can be used to calculate, for example, composite values for a portfolio as will be discussed below.

Portfolio Values

Given probability models for more than one task that are coincident in time, the probability model for any combination of tasks within a portfolio of tasks can be calculated at shared points in time. For a portfolio having a plurality of tasks that vary over time, wherein the tasks include a first and a second task and wherein the tasks share one or more common first parameters that vary over time, it can be advantageous to determine possible values of the first parameters for one or more values of time. In one embodiment, system 100 first generates a composite timeline that encompasses each task timeline. Two or more probability distributions are captured for each task, wherein the probability distributions reflect potential values of one of the first parameters at particular points on the composite timeline. Two points are selected on the composite timeline, wherein the two points are selected from points in time shared across each task timeline, and probability distributions of values of one of the first parameters for each task are determined at the two points in time.

Figure 10:
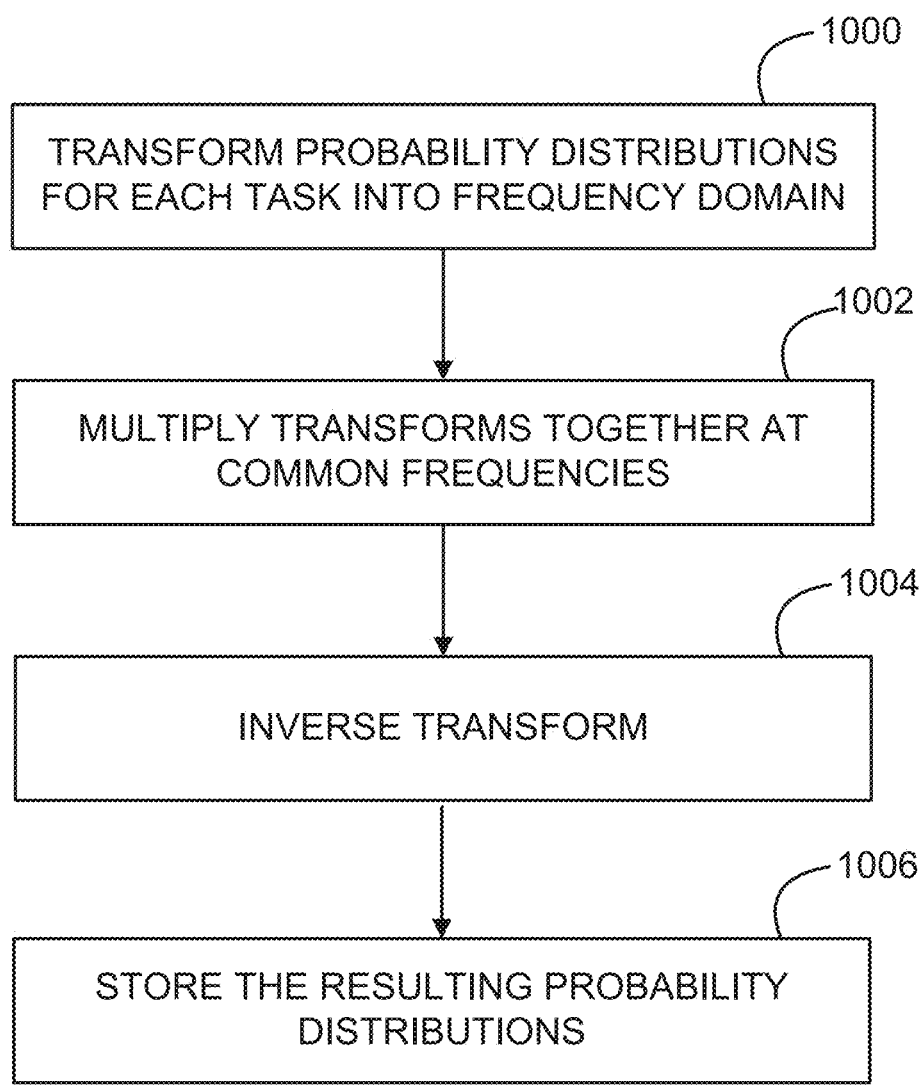
FIG. 10 shows a method of calculating probability distributions across two or more objects or tasks according to the present invention.

In one example approach, approximates for values are calculated using piecewise sampling and multiplication, or by using Monte Carlo methods, but in one or more embodiments of this invention a faster and more accurate method uses the mathematical operation of convolution. Convolution integrals may be calculated a number of ways. In one example embodiment of system 100, Fourier transforms are used to convert the probability models from x-axis of value to x-axis of frequency, and then to make use of the properties of Fourier transforms to calculate the resulting convolution integral. In general, as is shown in FIG. 10, the method is to obtain the convolution by performing, at 1000, a Fourier transform on each of the probability models to be convoluted, multiplying, at 1002, the transforms together at common frequencies, and performing, at 1004, an inverse Fourier transformation on the result. The resulting probability distributions are then stored at 1006.

In one embodiment, another stage is added: All probability models to be convoluted are translated such that their lower limit values are at or near zero. The Fourier transforms are performed on the translated functions, the multiplication is performed on the resultant Fourier transforms, the inverse Fourier transform is performed on the result, and then the resultant convolution is itself translated such that it's lower limit is the sum of the lower limits of all of the probability models that went into the convolution. In one example embodiment, Fast Fourier Transform and Inverse Fast Fourier Transform methods are used.

For the non-limiting case of using transformed and scaled beta distributions, in particular, it can be advantageous to rescale the beta distributions so that they all start with a lower limit (A value) of zero. Then zero pad each function representing each beta distribution from each current upper limit (B value) to some common value greater than at least twice the sum of all the spans (B-A) of all the probability models that are intended to be convoluted. This is necessary to correctly approximate the resultant finite waveform in a Fourier transform. Then, for speed, incrementally sample the probability model so Fast Fourier Transform methods may be used. Note: at this point, if the span of one or more probability models that are being transformed is significantly less than the number of FFT points used to model the largest span, then the value of that probability model can be removed from the convolution, and added back on as a constant after the convolution is completed.

Given the properties of multiplication, and the speed of FFTs it should be seen that this method may be used to quickly and accurately calculate the resultant probability model for a given value for the convolution of many tasks at a point in time. Further, interpolated probability models may be calculated for many common points in time amongst many tasks, and thus the resultant probability models for a portfolio of tasks for a given value may be calculated over all the times of all the tasks in a portfolio. And further, just as with a single task, interpolation functions of appropriate types may then be applied between probability models at points in time for a given value on the resultant portfolio. And again, multiple values may be calculated on a portfolio.

Figure 11A:
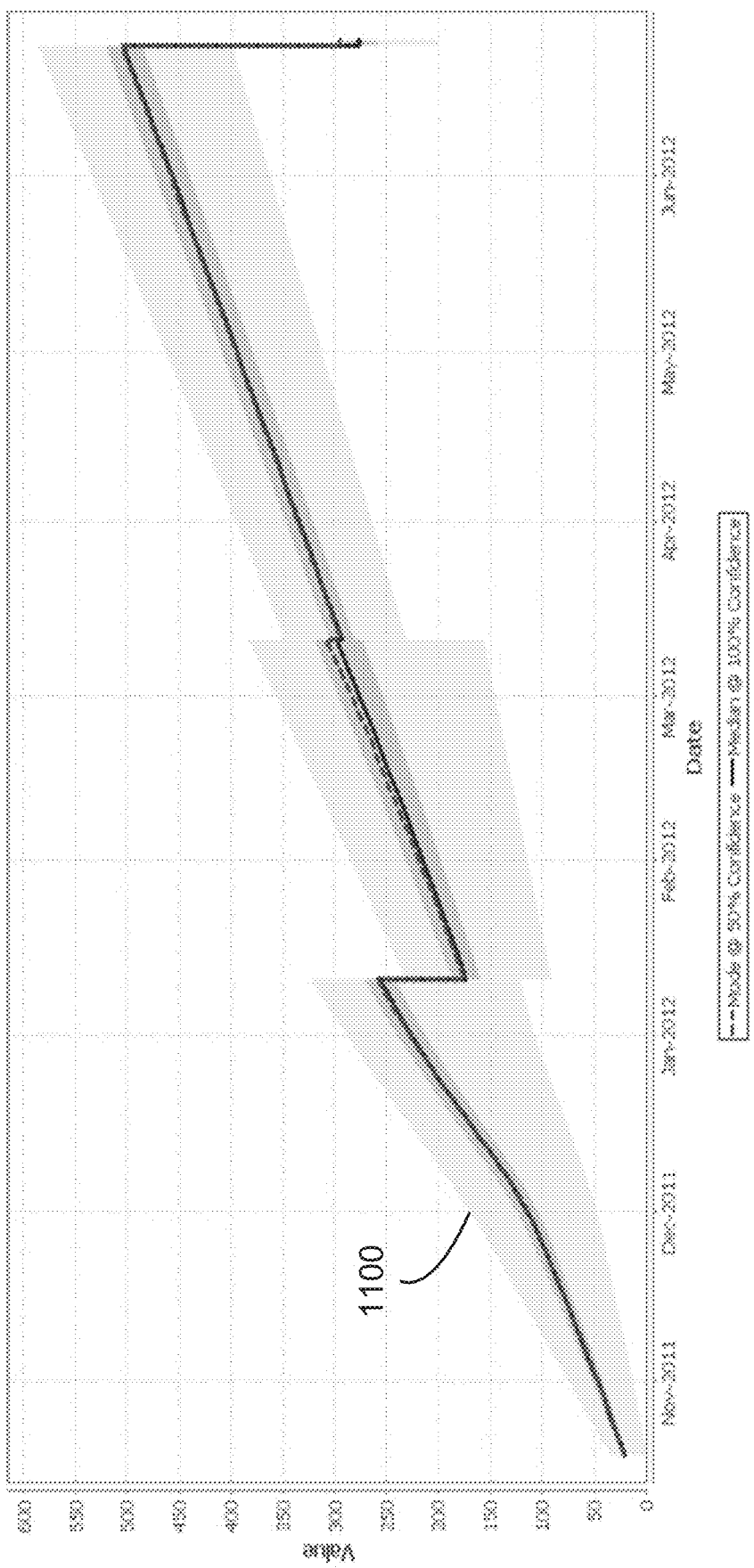
FIGS. 11A and 11B illustrate probability distributions of values of a first parameter across a set of tasks according to the present invention.

FIG. 11A shows a likelihood graph 1100 for one value of a portfolio of tasks that were thus calculated. In the example graph shown in FIG. 11A, as in the graphs of FIG. 8 and FIG. 9, lower limit, upper limit, median (solid line), and mode (dashed line) are displayed. As can be observed in FIG. 11A, there are potential discontinuities in portfolio likelihood graphs where tasks start or end, and value is added to or subtracted from overall portfolio value. So, it can be advantageous to use appropriate care in choosing interpolation functions close to these points in time, and interpolated probability models should be calculated on either side of these potential discontinuities. Essentially, stop the analysis on one side of the discontinuity, and restart the analysis on the other side.

Figure 11B:
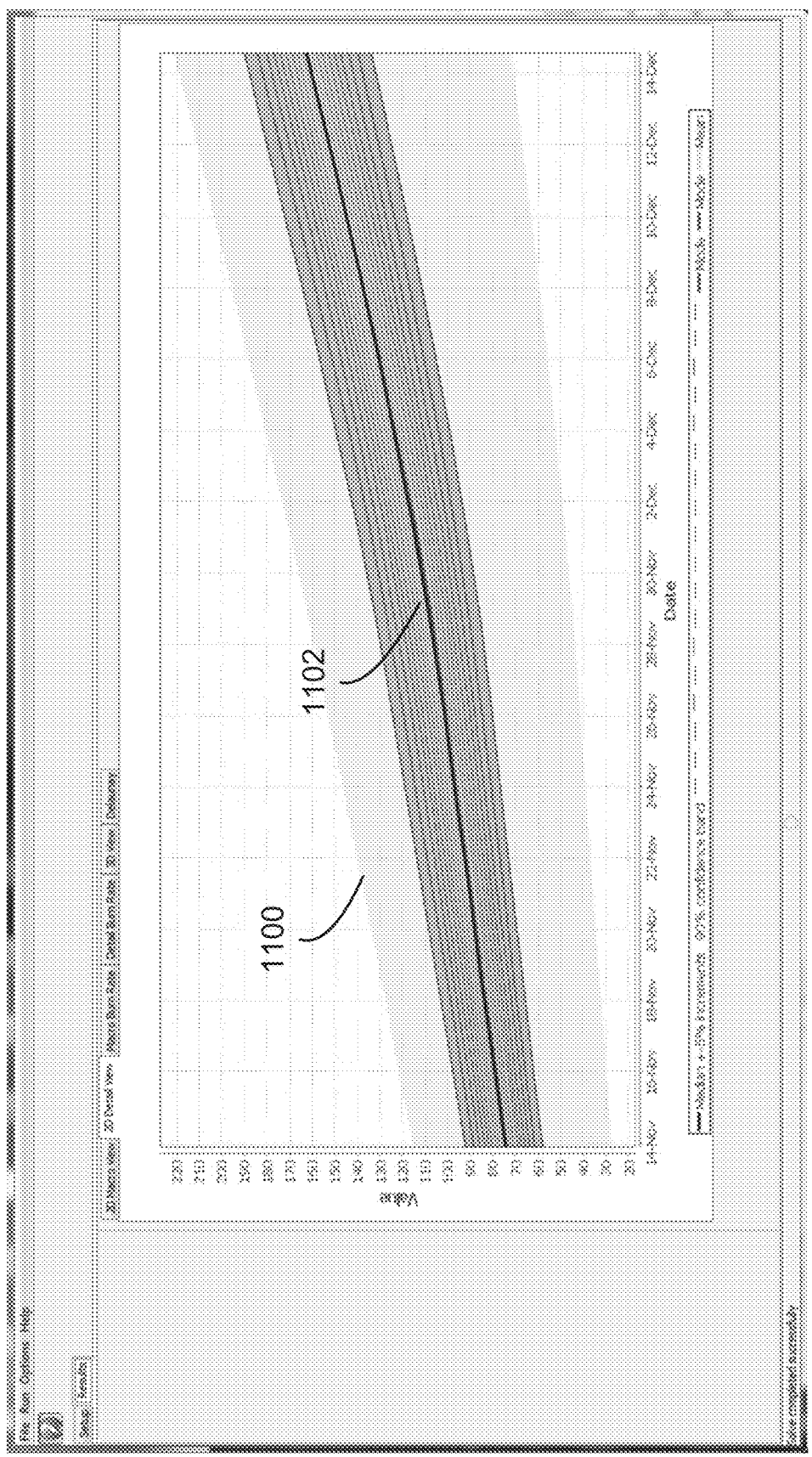

FIG. 11B illustrates one example embodiment of a likelihood graph 1100. In this graph, unlike the graphs of FIG. 8 and FIG. 9, aside from lower limit, upper limit, median (solid line), and mode (dashed line), likelihood is calculated and plotted as lines on the graph in 5% increments of probability from the median. As can be seen from examining the x-axis, the time period covered in FIG. 11B is a fraction of the time covered by graph 1100 of FIG. 11A. This was done to magnify the changes in graph 1100 over that shown in FIG. 11A.

In the embodiment shown in FIG. 11B, the increments are shown as solid lines in 5% increments moving outward from median line 1102. In one such embodiment, graph 1100 is displayed as a rainbow of colors extending out from median line 1102. Such an approach has proven to help the user visualize the various likelihoods.

The methods so far presented in this patent are orders of magnitude faster than traditional Monte Carlo methods, or other rules and sampling based methods. Obtaining a likelihood graph like that shown in FIGS. 11A and 11B for 200 tasks at 30 to 50 common points in time takes roughly 20 seconds on a current computer.

Figure 12:
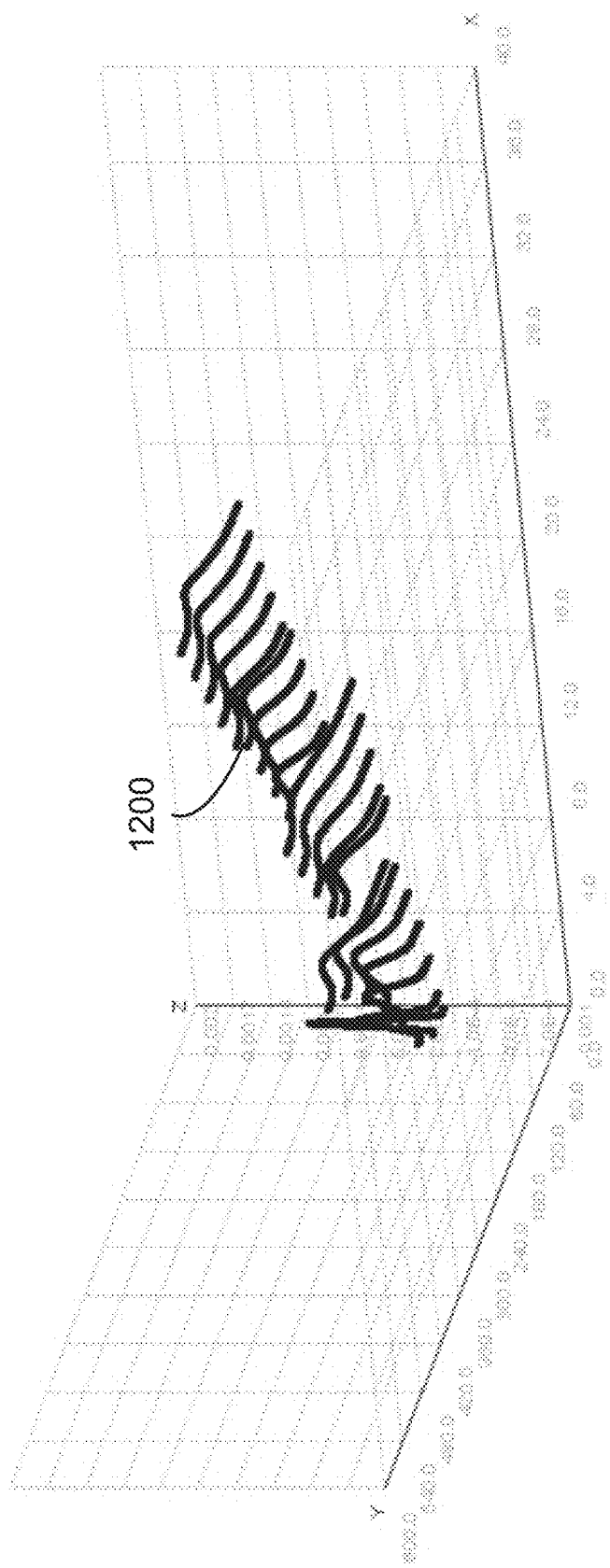
FIG. 12 is an alternate representation of the probability distributions of values of a first parameter across a set of tasks.

The methods so far presented in this patent are more accurate than traditional Monte Carlo methods. FIG. 12 shows some of the individual calculation points at which the data presented in FIGS. 11A and 11B are calculated. Each somewhat Gaussian looking curve 1200 in FIG. 12 shows the result of a mathematical convolution on intermediate probability models at that point in time. Note: the curves plotted are not Gaussian; they are the result of convolution on transformed and scaled beta distributions. Note: there are 100 data points shown in each convolution, which is reduced from the number actually calculated for ease of plotting.

Accuracy can be affected by the number of FFT points used, and by the amount of zero pad used, and by the relative span of many task probability models relative to number of FFT points used.

Given the properties of Fourier transforms on finite non-cyclic waveforms, it should be seen that for this method to be effective, probability models must be used that do not extend to infinity in one or more directions. Gaussian distributions or log-normal distributions cannot be used, unless they are trimmed to a finite range. Thus in one or more embodiments of this invention finite non-cyclic or trimmed versions of functions that if untrimmed would extend to plus or minus infinity are used.

Given probability distributions for groups of tasks or for portfolios, it is possible to manipulate the portfolio-wide probability distributions, and see the effect on the underlying objects. In one embodiment, the probability distributions of values of one of the first parameters for the portfolio at two points in time are displayed and modified under user control to arrive at a desired set of probability distributions for the portfolio. In one such embodiment, the modifications are back-propagated onto probability distributions for one or more of the underlying tasks. That is, modifications made to the probability distributions at the portfolio level are propagated back into the probability distributions of the objects that make up the portfolio. In one such approach, changes are made to the underlying probability distributions of the objects in such a way that combining the objects through, for instance, convolution, results in the desired set of probability distributions for the portfolio.

Given tasks in time, and the ability to calculate overall portfolio values on different axes of value, in one or more embodiments of this invention, tasks and their associated probability models are allowed to move in time and value. Task start time could move and end times and intermediate times and associated probability models move accordingly, either through simple translation of all models, or through scaling either in time or value as appropriate. The combinations of various tasks in a portfolio moving in time and or value result in alternate scenarios of future value and can be used to optimize portfolio outcomes. The ability to work with combinations of tasks in a portfolio and to calculate values of scenarios and optimize portfolios is a feature of one or more embodiments of this invention.

Further, for any given task, start time and stop time, or intermediate times do not have to be single value. For instance, start time could itself be modeled using a probability model. Then attached task value probability models would themselves be weighted by likelihood of start time probability, end time probability, or intermediate time probability. Each time combination results in a weighting of values at a point in time. Once the weightings are known, the interpolation methods and convolution methods described above can again be used, and overall portfolio value over time can be calculated. In one embodiment, system 100 applies two dimensional or higher dimensional convolutions in determining probability distributions in each of a number of axes.

Optimization

Given the ability to predict the values on different axis of value of alternative future scenarios in one or more embodiments of this invention PSO (Particle Swarm Optimization), GA (Genetic Analysis), Gradient Search, or other optimization methods or combinations of optimization methods are envisioned as framing the solution algorithms presented above allowing for automation of portfolio optimization as well as optimization through the more obvious cut and try methods on scenarios. For automated optimization, since the tasks effectively modeled as continuous in time and value, it can be advantageous to start with a shotgun method, and progress to a PSO method. Gradient Search methods are viable for optimizations with few tasks, but for most scenarios, PSO will converge faster. To optimize with choices between scenarios, it can be advantageous to start with a shotgun method, and progress to a GA method.

For any of these optimization methods to work, a fitness function must be defined. A fitness function is a numerical definition of "best". The definition may include one or more measures of value at points in time, and/or one or more measures of risk (probability) at same or other points in time. These numeric values are then ratioed or otherwise numerically combined to yield a fitness function that is then optimized (either maximized or minimized). For example, maximizing the fitness function of portfolio monetary value 5 years from start, while at the same time minimizing risk at yearly points along the life of the portfolio would entail a fitness function with monetary value in the numerator, and values of deviation from mean at points in time in the denominator.

While many of the examples shown in this specification revolve around reviewing changes in tasks over time, and predicting future value, it is to be understood that time is just one measurable dimension along which these methods could be applied, and it is to be understood that in one or more embodiments of this invention one or more measurable dimension may be used in place of or along with time, and that the word dimension is intended to represent a measurable continuum which may or may not be a spatial dimension.

Tracking and Correcting

Tracking and correcting are also possible. Given predictions of likelihood of task and/or portfolio future value over time, and the ability to predict likelihood of "burn rate" the derivative of task or portfolio value over time, in one or more embodiments of this invention actual value at elapsed times, and actual "burn rates" at elapsed time are tracked and used to reset values at time=now, and if deemed appropriate, adjust and refine future time value probability models. If actual task "burn rates" or value differ significantly in likelihood from predicted "burn rates" or value, actual value and/or "burn rate" may be used with or without interpolation functions to adjust future probability models, and improve future model accuracy. Further, if overall portfolio value or rate of change of value differs significantly from predicted values, tracking of values and "burn rates" at the portfolio level and drill down to the task level may be used to determine where models are deviating from reality, and appropriate adjustments may be made. Using these tracking and correcting methods, the task and portfolio models themselves become sources of tacit and explicit knowledge that may be used to correct current models and/or to build similar future models with increasing expertise and accuracy.

Business Uses

Business uses will be discussed next.

The methods discussed above can be used, for example, to plan a product launch. In one such example, a product is in planning. What is the expected likelihood of its profitability over time? Factors considered in a product launch may include such factors as research costs and likelihood of meeting product performance targets; patent costs, timing, and likelihood of success over time; manufacturing research costs and likelihood of meeting manufacturability targets; manufacturing developments costs, timing, and likelihood of success over time; plant rollout costs, timing, and likelihood of success over time; ongoing manufacturing costs, timing, and likelihood of change; marketing costs, timing, and likelihood of success over time; sales costs, timing, and likelihood of success over time; and competitive headwinds in terms of impact on costs, timing, and likelihood of success over time.

A traditional method of estimating likely profitability is to perform pro forma estimations: estimate single values of expected return and expected cost at one or more discrete points in time, and then compare the rate of return to a hurdle rate. The pro forma calculation is typically put together by the product lead, after gathering inputs from stakeholders, and then presented to upper management with a justification paper. The justification paper may or may not cover alternate manufacture/sales/distribution scenarios, but typically a single expected case pro forma statement of cost and return is presented. In the end, much of upper management's decision on the value of the pro forma depends on the thoroughness of the supporting document, and the past track record and trust upper management has in the people who generated the pro forma document.

One problem with this method is the single value statements of likelihood in time. The effects of possible and/or even expected changes in costs, timing, or competitive or market pressures are not clearly captured or communicated.

Using the methodology and tools described above, a much clearer statement of likely value of individual tasks, task aggregates, and the overall project, nearly continuously over time, may be made and clearly communicated. For each task to bring the product to market: One or more domain experts on each task that is performed may detail not just expected value at discrete points in time for that task, but also likelihood of reaching that value of cost or profit, and likelihood of reaching alternate values. In one example embodiment, these statements of likelihood of value at discrete points in time may be viewed as captured in probability distributions orthogonal to the time axis on a hart such as shown in FIG. 3.

The software then estimates values and likelihoods at intermediate points in time along each task, and domain experts can then apply both facts at their disposal and tacit knowledge and experience to modify probability distributions until task likelihood over time matches each domain expert's expectations. If more than one domain expert has worked on a task, their aggregate opinions may be used to adjust probability distributions at points in time along a task, or alternatively, each domain expert may work alone, and experts or others may give their resultant tasks and time dependent probabilities different weightings. The software may then calculate a consensus likely outcome for each task.

As noted above, such an approach takes into account not only each expert's expectations, but also the amount and range of uncertainty in that expectation. For instance, the patent acquisition task has a positive value to the company based on the value of the patent in the market but a negative contribution based on the costs of obtaining the patent in legal and filing fees. A probability distribution associated with the patent acquisition task would be based on the explicit knowledge of acquisition costs and the tacit expectations of value of the patent in the market.

Similarly, the ongoing manufacturing task would have costs as estimated from, for instance, a business intelligence system. In addition, more tacit factors such as changes in supplier cost, delivery and quality and their effect on the product can be modeled as noted above.

Not only the tasks of research, development, rollout, ongoing manufacturing, marketing, sales, and the other tasks involved in delivery of a product to a customer and receipt of payment for that product may be modeled showing likelihood of value over time, but also the likely effects on overall product profitability of less controlled variables such as customer uptake, competitive product pressures, and other market factors. Each of these factors may be modeled as likely values in probability distributions adding positive or negative over time.

Given consensus estimates of likelihood of value over time for each task and market headwind (modeled as tasks), the software can then estimate consensus likely near continuous probabilities of value over time for each task; estimates of likely near continuous probabilities of value over time for each task aggregate; and estimates of likely near continuous probabilities of value over time for the entire project.

In one embodiment, each task is annotated with metadata describing who made the estimates, when they were made, assumptions that went into the estimate, and why this consideration. This allows for easy traceability and accountability.

The graphical nature of the output allows for easy assimilation of complex results, and simple drill-down to check values, sources, and assumptions, both in the aggregate and at the task level. The result is clearer statements of potential values, risks, and rewards of taking the product to market.

These methods and tools therefore facilitate decisions by decision makers by creating cleanly communicated and readily understood statements of potential values, risks, and rewards.

In another example business use, management may be considering releasing a new product line under one of two scenarios. In both cases new product performance is a significant improvement over current competition. The question facing management is, whether it is better to go with a manufacturing process that is patentable but slow and expensive to develop, or to go with a manufacturing process that is not patentable but is fast and cheap to develop. Each approach results in approximately the same manufacturing costs. Which approach is more valuable over the life of the product?

A traditional method of making such a decision may be to perform pro forma estimations for each scenario, and along with review of the relative financials, have discussions with stakeholders and upper management on ramifications of the decisions to be made . . . until consensus is reached, or a decision is made.

One problem with traditional pro forma methods is the fact that pro formas typically do not capture the effects of competitive headwinds on profits. However, in this business use, how fast a competitor may follow and erode profits is critical to the decision, and not captured in the scenario pro formas.

Using the methodology and tools detailed herein, in one example embodiment each potential competitive headwind, as well as each potential regulatory headwind or tail wind, is modeled using separate tasks in time and likelihoods, and their probable effects on returns are estimated. The methods and tools, therefore, capture the probable effects on goals of external factors and events in time better than traditional methods.

A second problem with this method is a lack of clarity and traceability. It is not unusual using this traditional method for factors affecting risk and reward to be seen differently by different people, and communicated poorly in discussions at different levels in a corporation. This lack of clarity on potential risks and rewards may result in unforeseen consequences and potentially lost profits. Effectively the decision process is the corporate equivalent of the telephone game.

The current approach provides a much clearer statement of likely value for each scenario. In addition, it gives us the ability to better capture domain expert knowledge and opinion, and drill-down and segregate opinions on likelihood of risks and rewards over time on individual tasks, task aggregates, and overall scenario value.

In addition, in one example embodiment, the added ability to graphically compare likeliness of risk and reward between many alternate scenarios further enhances the decision making process. Near continuous views of relative risk and reward over time for each scenario may be made and clearly communicated, and the factors going into the statements of risk better understood.

In another example business use, the above approach can be used to aid in understanding the effect of an acquisition. For instance, it is possible to estimate an expected profitability of the acquisition over time.

This use case is similar to the new product line case in that domain experts are used to evaluate potential benefits and risks, with the added factors that the purchasing company likely has poorer visibility into some of the potential risks.

This offers further opportunity for the methodology and tools described above. Domain experts can list all identified sources of risk and reward as tasks with likely positive and/or negative value over time. The software will then yield statements of probability of likely value over time for tasks, task aggregates, and the overall acquisition. Probabilities of success are more clearly made visible, and sources of risk better understood.

Another potential business use is in product mix optimization. In this example, a business has multiple product lines with different Engineering, Manufacturing, Marketing, and Sales costs. Each product line has different potential profit margins depending on performance characteristics, customer cost tolerance, and competitive pressures. The company has domain experts capable of estimating likely costs, profit margins, customer cost tolerance, and competitive pressures. The company has opportunities to develop new products, increase marketing push, build more plants, increase distribution channels, and change profit margins. The company has limited resources but wants to determine the mix of spending and price setting that will yield the greatest likelihood of high profits over time. In addition, the company would like to calculate how that mix should change if, for instance, market headwinds change, or if overseas competitive response change, if regulatory pressures change, if the economy improves/declines or if the cost of money changes.

This is a logical follow-on to the use cases above—with added complexity. Just as a product may be modeled, a product line may be modeled . . . made up of products as sub-task aggregates. And, product lines may be aggregated to a divisional and corporate level. Since in the software, tasks may have values that may be changed over time, and tasks and task aggregates may be shifted in time, different mix scenarios may be modeled and compared to find optimal profit product mixes. Further, optimization methods (Gradient Search, PSO, GA, etc) may then be applied to the different scenarios to further automate the process of maximizing portfolio value.

The above methods can be used to perform roll-up and layered analysis. On any of the above analyses, Departmental and Divisional Product managers may run likely future scenarios. Each manager has made predictions for his/her products. The people running the analysis at any level may be uncoupled from those above and below them. Their methodology and success rate in predicting future value likely varies. So, at a higher level, their predictions of expected likelihood may be combined and valued based on tacit knowledge held by leaders to predict overall portfolio value and possible future scenarios. For instance, superiors may weight the values predicted by each of their subordinates differently. In one embodiment, the software applies those weightings while estimating overall portfolio risk.

The above methods can be used for tracking financial portfolios. Given a portfolio mix, and given actual performance values over time, the methods can be used to predict future values of the portfolio, and to correct in real time based on actual performance and on changes in the factors driving the product mix.

In this use case, a portfolio has been modeled, and decisions on path forward have been made. Time has passed, and actual performance numbers (actual values on one or more of the tasks in the portfolio at points in time) have been obtained. In one example embodiment, these performance numbers are used by the software not only to show performance against plan, but to automatically re-calculate future probability values and burn rates on individual tasks in the portfolio, and, using the software, then re-estimate probability of likely future value for the portfolio based on current data. Further, in one such embodiment, domain experts are used to take into account current data and use their tacit knowledge to re-estimate task future values. Portfolio values are then calculated.

Such portfolio modeling can be adapted to other financial planning uses such as, for example, retirement scenario planning, stock market modeling, insurance risk modeling.

One commonly used method of modeling risk is Monte-Carlo modeling. Monte-Carlo modeling requires a great many runs to achieve relatively inaccurate results. The underlying problem is that each Monte-Carlo model is essentially a discreet track in time. If one looks at the results at one future point in time, combining the results of many models gives a histogram like result approximating a probability distribution, but depending on desired accuracy, many thousands of runs would need to be made. For this reason, typically relatively few variables are dealt with using Monte-Carlo methods.

The methodology and tools of this patent may be used to significantly extend and increase Monte-Carlo method accuracy, increase the degree of complexity in scenarios modeled, and improve the quality of capture of tacit knowledge of domain experts.

One method to improve accuracy of Monte-Carlo modeling of a task is to use Monte-Carlo discreet values at points in time to generate curve fits to probability distributions orthogonal to time at given points in time, and then use the methods and tools described above to handle calculation of probability distributions at other points in time along the task timeline, and the complexity of predicting likelihood for combinations of individually modeled tasks (Monte-Carlo modeled and non-Monte-Carlo modeled) over time. In this manner, the number of Monte-Carlo trials needed for accuracy can be reduced by using fits to Beta or other probability distributions. Further, complexity can be increased, since each task in an analysis may represent a different Monte-Carlo or other modeling method's results. Moreover, the methods described also allow for a mix of simulation modeling of task value, and domain expert experiential representations of task value. This combination of simulation modeling results and captured tacit expert knowledge is unique and powerful.

The above methods can be used to facilitate crowd sourced predictions of a value X at time Y. Crowd sourcing has been used to predict sporting outcomes, stock market outcomes, medical outcomes, military outcomes, etc.

In the portfolio tracking segment above, single actual measures of value at points in time along a task are used to improve the quality of future predictions by setting the value and rate of change at known points in time. In a similar fashion, in one example embodiment, an individual's discreet statements of value (e.g.: I predict the DOW will hit 12,000 on Jan. 1, 2013) are aggregated to yield probability distributions orthogonal to time at future points in time for particular objects, tasks or outcomes. These aggregated individual statements of likelihood are similar to the histogram inputs obtained from Monte-Carlo modeling, and can then be used in further portfolio and scenario analysis in a similar manner.

In another example embodiment, individuals are asked for shapes of probability distributions and likelihoods of X at time Y, just as domain experts were asked in the business use cases. In that embodiment, by combining the various crowd sourced probability distributions at various points in time, consensus statements of likely probability distributions of values of X at time Y, and changes of X over time, are made.

As with the business scenario where upper level managers weighted subordinate's estimates based perhaps on past performance, or other tacit knowledge, individual's statements of value in a crowd sourced estimate could be weighted based on past accuracy or other criteria (such as troll filters).

The above methods can be used to make decisions based on considerations other than money. It should be clear that value does not have to be monetary. In the health arena, value could, for instance, be patient health outcome, or perhaps some measure of optimal health for minimal cost.

In one example embodiment, treatment paths are modeled as combinations of tasks over time. In one such embodiment, alternate treatment paths are modeled as alternate scenarios. So, using the methods described above, and substituting measures of health outcome over time, or measures of health outcome per cost over time, or even using two measures simultaneously (with both probability of health outcome and probability of cost orthogonal to time), health scenario planning and likely outcomes are modeled in a similar fashion to the business scenario modeling above. As in the business scenario modeling examples above, in some example embodiments, past real health outcomes are used to improve the accuracy of each scenario model. So, for example, patient or hospital inputs on outcomes of cancer treatments and alternatives (surgery, radiation, chemo, timing and combination differences using many different methods of treatment) for different cancers of a similar type (analogous to a product) and/or for different doctors (analogous to a market headwind) are modeled. Then, decision trees based on other's predictions and/or expert predictions are aggregated as noted above.

The above methods can be used for military applications. Again, values do not have to be limited to monetary, and more than one value may be associated with given tasks. In the military arena, in one example embodiment, a portfolio is created with one or more objects that have values that vary over a parameter such as time. In one such embodiment, the objects vary as a function of three different values: a value based on some measure of military outcome, a value based on some measure of political outcome and a value based on operational cost. There may or may not be a correlation between one or more values, but they all have the potential to change over the second parameter (in this case time). Tasks and task aggregates may represent such diverse things as troop levels in Kandahar, political stability of the Afghani government, or Terrorist acts over time in various provinces.

Further, the military (and some other governmental agencies) use the concept of "strict compartmentalization" as a way of segregating sources, methods and analysis. The methods and tools described above can both support and enhance these military procedures. Again, using the methods and tools described above, in one example embodiment, both explicit facts and tacit knowledge from various domain experts are captured. The capture of tacit knowledge (feelings, experience, guesses, etc.) is enhanced and made useful by capture in probability distributions that are orthogonal to time. In one such embodiment, strict compartmentalization is strongly supported in that tasks and task aggregates can be annotated with information describing who made the estimates, when they were made, what went into the estimate, and the reasons behind the estimate. These considerations, along with any other desired metadata, are stored. The various contributions are, in some embodiments, weighted, and combined using the tools described above to yield probability maps over time describing task likelihood, aggregate task likelihood, portfolio likelihood, and scenario likelihood. The methods allow for high levels of complexity, and high levels of clarity and traceability.

The above methods can be used in political campaigning. Again, more than one value may be associated with given tasks. In the political arena, one value may be financial cost; another value may be political outcome (e.g., voter turnout in your favor). In one example embodiment, tasks represent advertising campaigns, voter turnout efforts targeted to specific voter sub-groups, various types of contribution raising efforts, and the money spent and likely voter turnout results from attack advertisements. Each "task" has a start time, a stop time, and duration, and probability distributions orthogonal to the time axis represent money spent on one axis, and likelihood of positive or negative voter turnout on another. In one example embodiment, software models "tasks" representing tailwinds from PAC efforts, or headwinds from fact checkers, or unexpected disclosures from other political parties or other third parties. In one such embodiment, software also models likely headwind or tailwind effects from international news events or government actions. In one embodiment, task aggregates can be calculated based on groupings of diverse tasks, such as state-level costs of campaigning and on vote r rollups or on group level effects. For example, one can calculate the aggregate likely costs and effects of attack advertisements on white single women under 30. Using the tools and methods described above, alternate scenarios can be played out, and probabilities calculated. The tools and methods of this patent handle complexity at much higher levels than Monte-Carlo methods, and with much higher accuracy, thus much more nuanced political calculations of probable results can be made.

Figure 13:
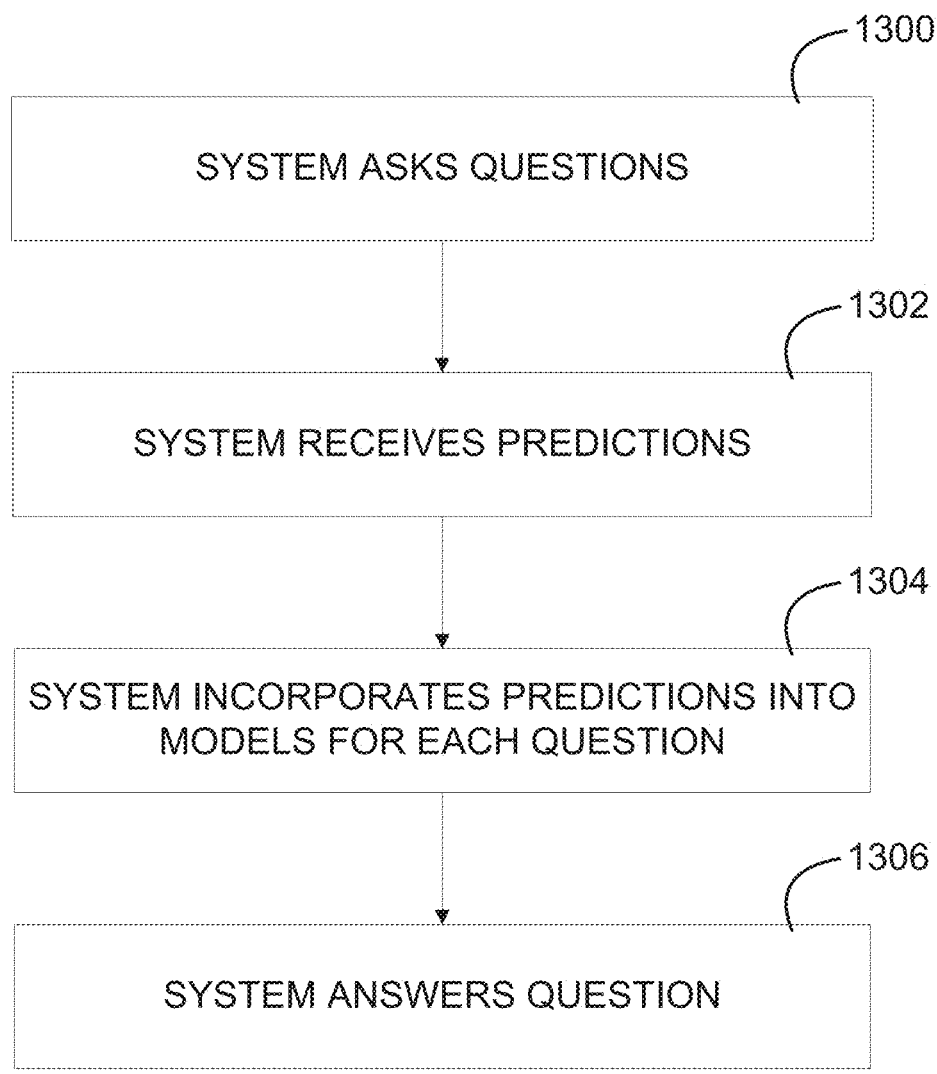
FIG. 13 illustrates a method of predicting future values in response to user input.

Finally, in one embodiment, the above methods are used to provide a Pythia-like experience to users. Pythia was a name given to the priestesses at the Temple of Apollo in Delphi (also known as the Oracle of Delphi). The oracle was active for roughly 1000 years. In one such embodiment, as is shown in FIG. 13, a user accesses system 100 via, for instance, a network such as the Internet. The user is asked, at 1300, to answer a series of questions, each on a different topic but each related to future value of a parameter. In one such embodiment, five questions are asked and five answers received at 1302. The five answers are used, at 1304, to refine the probability distributions for each of the five topics.

Once the questions are answered the user is allowed to ask one question regarding future value of a parameter and, at 1306, system 100 answers the question based on the probability distributions accumulated for that question.

The process is repeated, with the probability distributions becoming more accurate over time as more people participate.

In one such embodiment, a user's answers are weighted as a function of the accuracy of their previous answers, or by topic as a function of the accuracy of their answers for particular topics. In one embodiment, a user's answers are given more weight if he or she is a domain expert for that topic.

In one Pythia-like embodiment, system 100 is seeded with probability distributions for a variety of topics. In one such embodiment, participants such as domain experts provide the initial probability distributions, but those distributions change over time as a function of the user predictions received in response to the five questions.

Although specific embodiments have been illustrated and described herein, it will be appreciated by those of ordinary skill in the art that any arrangement which is calculated to achieve the same purpose may be substituted for the specific embodiments shown. The invention may be implemented in various modules and in hardware, software, and various combinations thereof, and any combination of the features described in the examples presented herein is explicitly contemplated as an additional example embodiment. This application is intended to cover any adaptations or variations of the example embodiments of the invention described herein. It is intended that this invention be limited only by the claims, and the full scope of equivalents thereof.

What is claimed is:

1. In a group having a plurality of objects, including a first object, a method of calculating, for the group of objects, a composite bounded probability distribution of values of a first parameter at one or more values of a second parameter, wherein the first and second parameters are different parameters, the method comprising:

receiving, for each object, a bounded probability distribution of values of the first parameter for each of one or more different values of the second parameter, wherein each bounded probability distribution defines likelihood for the respective object that specific values in a finite interval will occur; and determining, in a computing device, the composite bounded probability distribution for the group of objects at a selected value of the second parameter, wherein determining includes performing a frequency domain convolution based on one or more of the bounded probability distributions received for each object in the group of objects, wherein the composite bounded probability distribution defines, for the group of objects, a bounded probability distribution of values of the first parameter at the selected value of the second parameter, wherein the composite bounded probability distribution for the group of objects represents aggregate likelihood for the group of objects of achieving particular values of the first parameter.

2. The method of claim 1, wherein the second parameter is time.

3. The method of claim 1, wherein determining includes selecting an additional second parameter value for the first object and determining a bounded probability distribution for the first object at the additional second parameter value based on the one or more of the probability distributions received for the first object.

4. The method of claim 1, wherein the group of objects further includes a parent object and two or more child objects, wherein each child object includes one or more bounded probability distributions of values of the first parameter; and wherein determining further includes determining a bounded probability distribution for the parent object as a composite bounded probability distribution of one or more of the bounded probability distributions of each of the child objects, wherein determining the parent composite bounded probability distribution includes performing a frequency domain convolution based on one or more of the child bounded probability distributions.

5. The method of claim 1, wherein the group of objects further includes a parent object and two or more child objects, including a first child object and one or more second child objects, wherein each child object includes one or more bounded probability distributions of values of the first parameter;

wherein determining further includes:

determining a bounded probability distribution for the parent object as a composite bounded probability distribution of one or more of the bounded probability distributions of each of the child objects, wherein the one or more bounded probability distributions of the first object are given greater emphasis in the composite bounded probability distribution of the child objects than the one or more bounded probability distributions of the second objects.

6. The method of claim 1, wherein one or more values of the second parameter are expressed as bounded probability distributions.

7. The method of claim 1, wherein each probability distribution received is a translated and scaled beta probability distribution.

8. The method of claim 1, wherein one or more of the bounded probability distributions received have 100% likelihood at a given scalar value of the first parameter, and wherein performing the frequency domain convolution based on one or more of the bounded probability distributions received for each object in the group of objects includes converting the bounded probability distribution for each object at the selected value of the second parameter into the frequency domain using a transform only if the respective bounded probability distribution does not have 100% likelihood at a given scalar value of the first parameter.

9. The method of claim 1, wherein performing the frequency domain convolution includes applying a transform from a group of transforms comprising a Fourier transform and a Laplace transform.

10. The method of claim 1, wherein the composite bounded probability distribution has a shape, wherein performing the frequency domain convolution includes:

selecting a bounded probability distribution for each object in the group of objects;

determining a composite bounded probability distribution lower limit by summing lower limits of the selected bounded probability distributions;

determining a composite bounded probability distribution upper limit by summing upper limits of the selected bounded probability distributions;

calculating a span for each selected bounded probability distribution by subtracting the lower limit of the respective bounded probability distribution from the upper limit of the respective bounded probability distribution;

determining a maximum span from the calculated spans;

generating a periodic waveform for each selected bounded probability distribution, wherein generating the periodic waveform includes zero padding each of the selected bounded probability distributions out to a common wavelength greater than the maximum span;

transforming the periodic waveform generated for each of the selected bounded probability distributions into the frequency domain using a transform, wherein transforming the periodic waveform includes converting one wavelength of each periodic waveform into an array of points and transforming each array of points into the frequency domain;

performing complex multiplication of each transformed array of points to form an aggregate transformed array of points;

performing an inverse transform on the aggregate transformed array of points to form a periodic waveform result; and converting one cycle of the periodic waveform result to an array of points defining the shape of the composite bounded probability distribution, and wherein determining the composite bounded probability distribution further includes mapping the array of points defining the shape of the composite bounded probability distribution onto an interval defined by the composite bounded probability distribution lower limit and the composite bounded probability distribution upper limit.

11. The method of claim 10, wherein mapping the array of points includes scaling the mapped array of points so than an integral across the mapped array of points is approximately equal to one.

12. The method of claim 10, wherein each generated periodic waveform is translated along the first parameter axis such that the waveforms are in phase.

13. The method of claim 10, wherein generating the periodic waveform includes zero padding to a common wavelength greater than or equal to approximately twice the maximum span.

14. The method of claim 10, wherein selecting the bounded probability distribution for each object includes determining, for each object, a bounded probability distribution for the respective object at the selected value of the second parameter.

15. The method of claim 1, wherein determining the composite bounded probability distribution includes modifying one of the bounded probability distributions received for the first object such that the bounded probability distribution has a different impact on the composite bounded probability distribution than an impact of one of the bounded probability distributions received for a different object.

16. The method of claim 1, wherein the objects from the group of objects are distributed across two or more subgroups of objects, wherein each subgroup of objects includes two or more of the objects from the group of objects;

wherein determining the composite bounded probability distribution for the group of objects at a selected value of the second parameter further includes:

determining a subgroup composite bounded probability distribution for each subgroup of objects at the selected value of the second parameter, wherein determining the subgroup composite bounded probability distribution for each subgroup of objects includes performing a frequency domain convolution based on one or more of the bounded probability distributions received for each object in the respective subgroup of objects; and wherein performing the frequency domain convolution based on one or more of the bounded probability distributions received for each object in the group of objects includes performing the frequency domain convolution on the subgroup composite bounded probability distributions.

17. The method of claim 1, wherein the group of objects includes a first subgroup of objects and one or more second subgroups of objects, wherein each subgroup of objects includes two or more of the objects from the group of objects;

wherein determining the composite bounded probability distribution for the group of objects at a selected value of the second parameter further includes:

determining a subgroup composite bounded probability distribution for each subgroup of objects at the selected value of the second parameter, wherein determining the subgroup composite bounded probability distribution for each subgroup of objects includes performing a frequency domain convolution based on one or more of the bounded probability distributions received for each object in the respective subgroup of objects; and wherein performing the frequency domain convolution based on one or more of the bounded probability distributions received for each object in the group of objects includes performing the frequency domain convolution on the subgroup composite bounded probability distributions such that the subgroup composite bounded probability distribution for the first subgroup of objects is given greater influence on the composite bounded probability distribution for the group of objects than the other subgroup composite bounded probability distributions.

18. A system, comprising:

a processor; and a memory coupled to the processor, wherein the memory includes instructions that, when executed by the processor, define, for each object of a group of objects, a bounded probability distribution of values of the first parameter for each of one or more different values of the second parameter, wherein each bounded probability distribution defines likelihood for the respective object that specific values in a finite interval will occur; and determine the composite bounded probability distribution for the group of objects at a selected value of the second parameter, wherein determining includes performing a frequency domain convolution based on one or more of the bounded probability distributions received for each object in the group of objects, wherein the composite bounded probability distribution defines, for the group of objects, a bounded probability distribution of values of the first parameter at the selected value of the second parameter, wherein the composite bounded probability distribution for the group of objects represents aggregate likelihood for the group of objects of achieving particular values of the first parameter.

19. In a group having a plurality of objects, a method of calculating, for the group of objects, a composite bounded probability distribution of values of a first parameter, the method comprising:
receiving, for each object, a bounded probability distribution of values of the first parameter, wherein each bounded probability distribution defines likelihood for the respective object that specific values in a finite interval will occur; and
determining, in a computing device, the composite bounded probability distribution for the group of objects, wherein determining includes performing a frequency domain convolution based on the bounded probability distribution received for each object in the group of objects,
wherein the composite bounded probability distribution defines, for the group of objects, a bounded probability distribution of values of the first parameter, wherein the composite bounded probability distribution for the group of objects represents aggregate likelihood for the group of objects of achieving particular values of the first parameter.

20. The method of claim 19, wherein the group of objects includes a first subgroup of objects and one or more second subgroups of objects, wherein each subgroup of objects includes two or more of the objects from the group of objects;
wherein determining the composite bounded probability distribution for the group of objects further includes:
determining a subgroup composite bounded probability distribution for each subgroup of objects, wherein determining the subgroup composite bounded probability distribution for each subgroup of objects includes performing a frequency domain convolution based on one or more of the bounded probability distributions received for each object in the respective subgroup of objects; and
wherein performing the frequency domain convolution based on one or more of the bounded probability distributions received for each object in the group of objects includes performing the frequency domain convolution on the subgroup composite bounded probability distributions such that the subgroup composite bounded probability distribution for the first subgroup of objects is given greater influence on the composite bounded probability distribution for the group of objects than the other subgroup composite bounded probability distributions.

21. The method of claim 19, wherein one or more of the bounded probability distributions received have 100% likelihood at a given scalar value of the first parameter, and
wherein performing the frequency domain convolution based on the bounded probability distribution received for each object in the group of objects includes converting the bounded probability distribution for each object into the frequency domain using a transform only if the respective bounded probability distribution for the respective object does not have 100% likelihood at a given scalar value of the first parameter.

22. The method of claim 19, wherein the group of objects further includes a parent object and two or more child objects, wherein each child object includes a bounded probability distribution of values of the first parameter, and
wherein determining further includes determining a bounded probability distribution for the parent object as a composite bounded probability distribution of the bounded probability distributions of the child objects.

23. A system, comprising:
a processor; and
a memory coupled to the processor, wherein the memory includes instructions that, when executed by the processor,
define, for each object of a group of objects, a bounded probability distribution of values of the first parameter, wherein each bounded probability distribution defines likelihood for the respective object that specific values in a finite interval will occur; and
determine the composite bounded probability distribution for the group of objects at a selected value of the second parameter, wherein determining includes performing a frequency domain convolution based on one or more of the bounded probability distributions received for each object in the group of objects,
wherein the composite bounded probability distribution defines, for the group of objects, a bounded probability distribution of values of the first parameter, wherein the composite bounded probability distribution for the group of objects represents aggregate likelihood for the group of objects of achieving particular values of the first parameter.

24. The method of claim 19, wherein the composite bounded probability distribution has a shape, wherein performing the frequency domain convolution includes:
selecting a bounded probability distribution for each object in the group of objects;
determining a composite bounded probability distribution lower limit by summing lower limits of the selected bounded probability distributions;
determining a composite bounded probability distribution upper limit by summing upper limits of the selected bounded probability distributions;
calculating a span for each selected bounded probability distribution by subtracting the lower limit of the respective bounded probability distribution from the upper limit of the respective bounded probability distribution;
determining a maximum span from the calculated spans;
generating a periodic waveform for each selected bounded probability distribution, wherein generating the periodic waveform includes zero padding each of the selected bounded probability distributions out to a common wavelength greater than the maximum span;
transforming the periodic waveform generated for each of the selected bounded probability distributions into the frequency domain using a transform, wherein transforming the periodic waveform includes converting one wavelength of each periodic waveform into an array of points and transforming each array of points into the frequency domain;
performing complex multiplication of each transformed array of points to form an aggregate transformed array of points;
performing an inverse transform on the aggregate transformed array of points to form a periodic waveform result; and
converting one cycle of the periodic waveform result to an array of points defining the shape of the composite bounded probability distribution, and
wherein determining the composite bounded probability distribution further includes mapping the array of points defining the shape of the composite bounded probability distribution onto an interval defined by the composite bounded probability distribution lower limit and the composite bounded probability distribution upper limit.

25. The method of claim 24, wherein mapping the array of points includes scaling the mapped array of points so than an integral across the mapped array of points is approximately equal to one.

26. The method of claim 24, wherein each generated periodic waveform is translated along the first parameter axis such that the waveforms are in phase.

27. The method of claim 24, wherein generating the periodic waveform includes zero padding to a common wavelength greater than or equal to approximately twice the maximum span.

28. The method of claim 24, wherein selecting the bounded probability distribution for each object includes determining, for each object, a bounded probability distribution for the respective object.

* * * * *